(12) United States Patent
Tsuji

(10) Patent No.: US 11,999,563 B2
(45) Date of Patent: Jun. 4, 2024

(54) AUTOMATED WAREHOUSE AND CONVEYANCE DEVICE

(71) Applicant: MURATA MACHINERY, LTD., Kyoto (JP)

(72) Inventor: Yuji Tsuji, Inuyama (JP)

(73) Assignee: MURATA MACHINERY, LTD., Kyoto (JP)

(*) Notice: Subject to any disclaimer, the term of this patent is extended or adjusted under 35 U.S.C. 154(b) by 775 days.

(21) Appl. No.: 17/262,804

(22) PCT Filed: Jul. 3, 2019

(86) PCT No.: PCT/JP2019/026445
§ 371 (c)(1),
(2) Date: Jan. 25, 2021

(87) PCT Pub. No.: WO2020/031562
PCT Pub. Date: Feb. 13, 2020

(65) Prior Publication Data
US 2021/0309457 A1  Oct. 7, 2021

(30) Foreign Application Priority Data
Aug. 6, 2018 (JP) ................................. 2018-147443

(51) Int. Cl.
*B65G 1/04* (2006.01)
(52) U.S. Cl.
CPC ......... *B65G 1/0421* (2013.01); *B65G 1/0435* (2013.01); *B65G 2203/0283* (2013.01)
(58) Field of Classification Search
CPC ............... B65G 1/0421; B65G 1/0435; B65G 2203/0283; B65G 1/0407; B65G 1/04
See application file for complete search history.

(56) References Cited

U.S. PATENT DOCUMENTS 7,686,559 B2 * 3/2010 Tsujimoto ............ B65G 1/0492
700/214
8,162,585 B2 * 4/2012 Tsujimoto ............ B65G 1/0407
414/940

(Continued)

FOREIGN PATENT DOCUMENTS

| JP | 2518763 B2 | 7/1996 |
|---|---|---|
| JP | 2005-231842 A | 9/2005 |
| JP | 2007-039187 A | 2/2007 |

OTHER PUBLICATIONS

Official Communication issued in International Patent Application No. PCT/JP2019/026445, mailed on Sep. 3, 2019.

*Primary Examiner* — Patrick H Mackey
(74) *Attorney, Agent, or Firm* — Keating & Bennett, LLP

(57) ABSTRACT

An automated warehouse includes a stacker crane, a switch, and a transfer controller. The stacker crane includes a traveling vehicle that travels in a first direction, a hoist carriage provided to the traveling vehicle, first and second transfer devices provided to the hoist carriage, and a lateral conveyor to move the first transfer device laterally on the hoist carriage. The switch switches between a first state that enables the lateral movement of the first transfer device and a second state that disables the same. When the switch selects the second state, the transfer controller moves the first and second transfer devices to positions corresponding to first and second shelves without moving the first transfer device laterally.

18 Claims, 20 Drawing Sheets

(56) References Cited

U.S. PATENT DOCUMENTS

| | | | |
|---|---|---|---|
| 8,670,861 B2* | 3/2014 | Yoshinaga | B65G 1/0407 |
| | | | 700/214 |
| 9,221,606 B2* | 12/2015 | Yoshinaga | B65G 1/0421 |
| 9,701,471 B2* | 7/2017 | Yamada | B65G 65/08 |
| 9,919,869 B2* | 3/2018 | Tanaka | B65G 1/0407 |
| 9,944,464 B2* | 4/2018 | Ueda | B65G 1/1373 |
| 10,486,903 B2* | 11/2019 | Yoshioka | B65G 1/04 |
| 10,730,697 B2* | 8/2020 | Ueda | H05K 7/1489 |
| 11,345,541 B2* | 5/2022 | Abe | H01L 21/67775 |
| 2009/0028675 A1* | 1/2009 | Tsujimoto | B65G 1/0407 |
| | | | 414/273 |
| 2017/0057745 A1 | 3/2017 | Ueda et al. | |
| 2021/0237976 A1* | 8/2021 | Tsukamoto | B65G 1/0435 |
| 2022/0135328 A1* | 5/2022 | Shimamura | B65G 1/0421 |
| | | | 700/218 |

\* cited by examiner

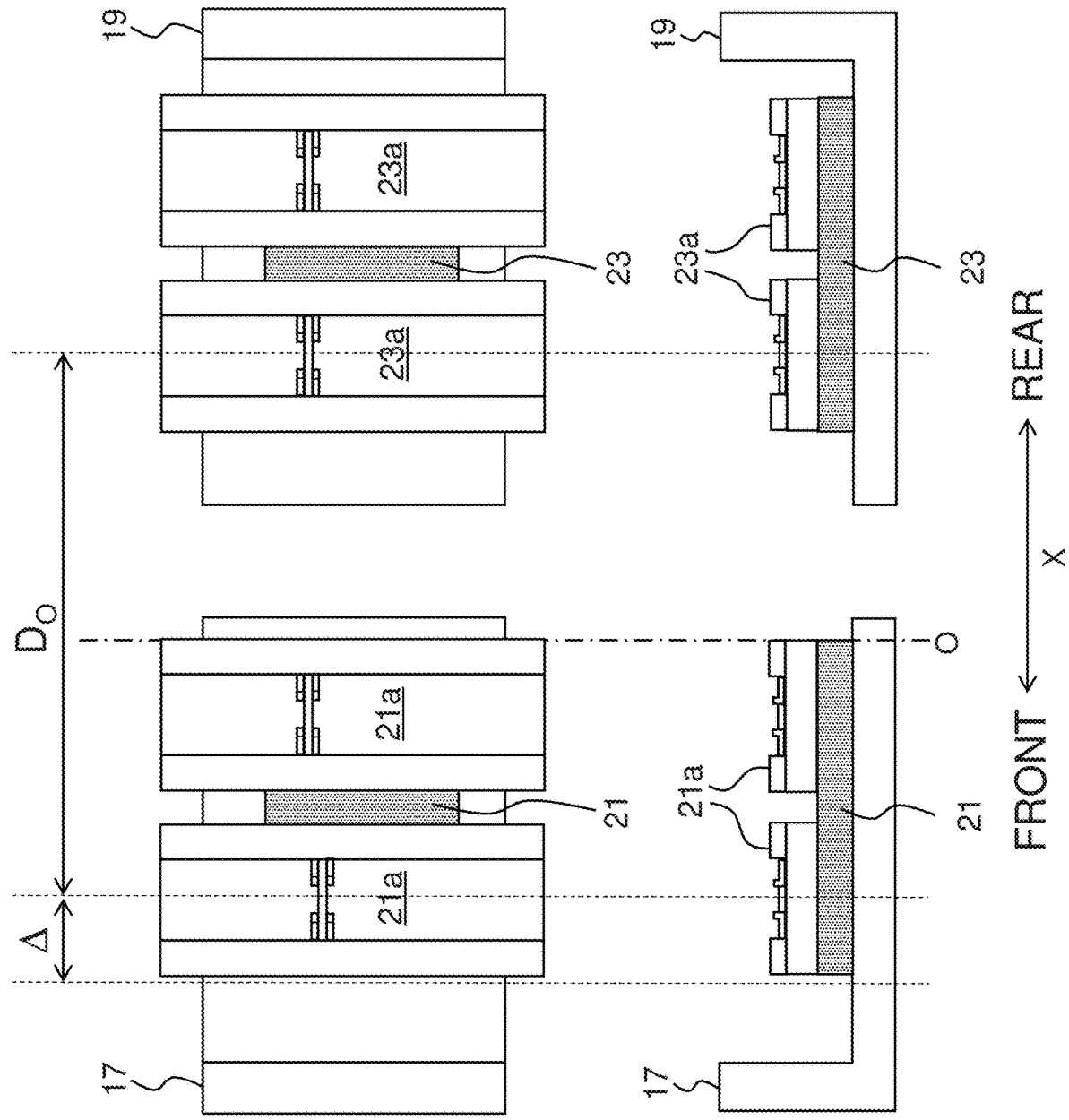

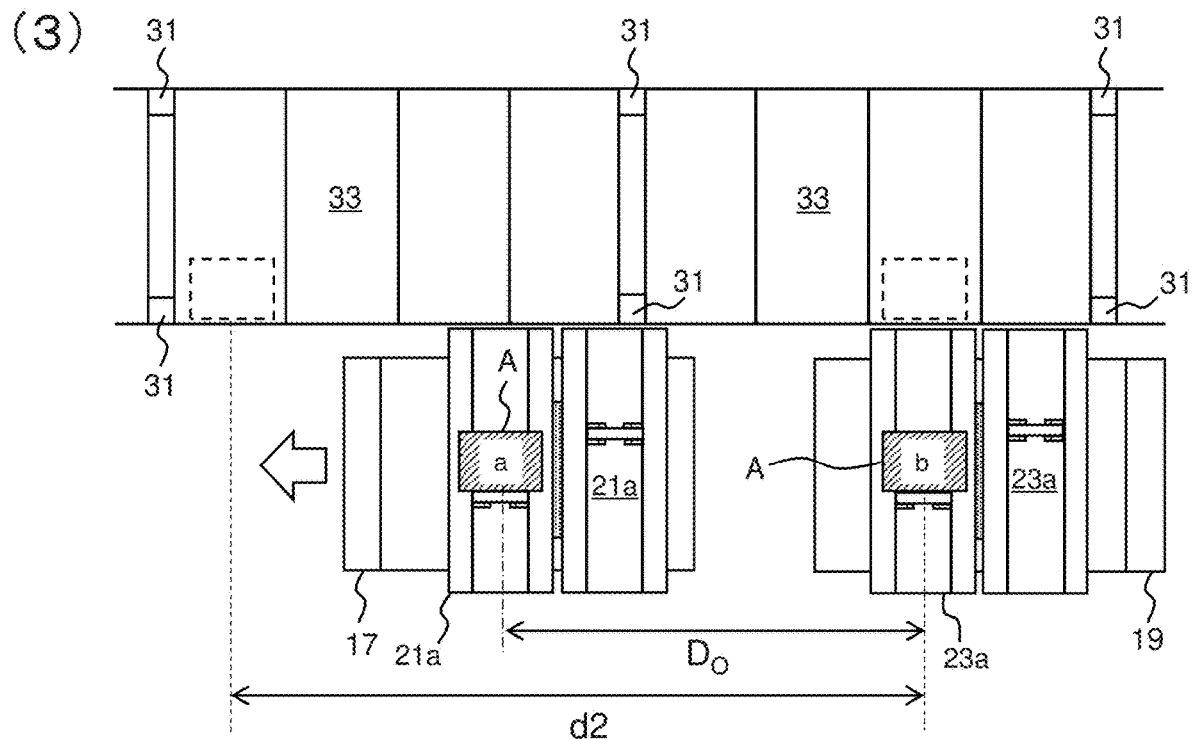
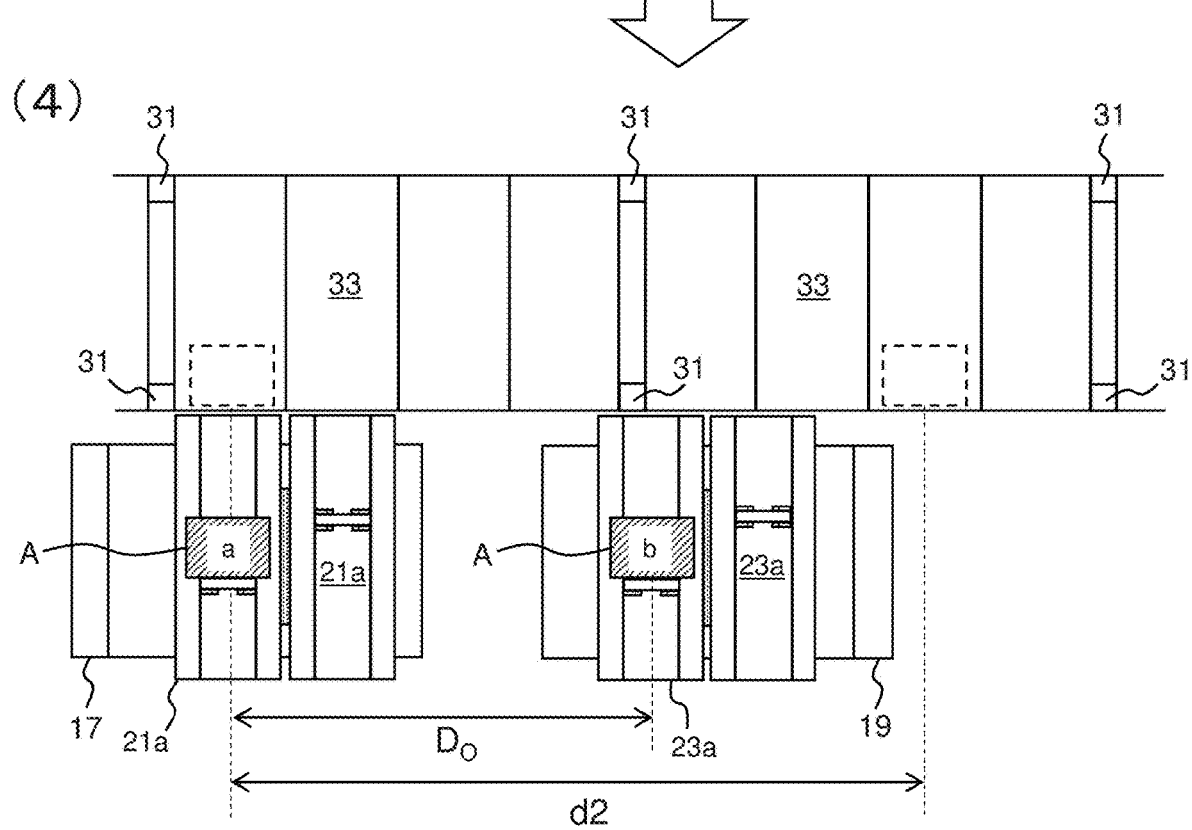
FIG. 10C

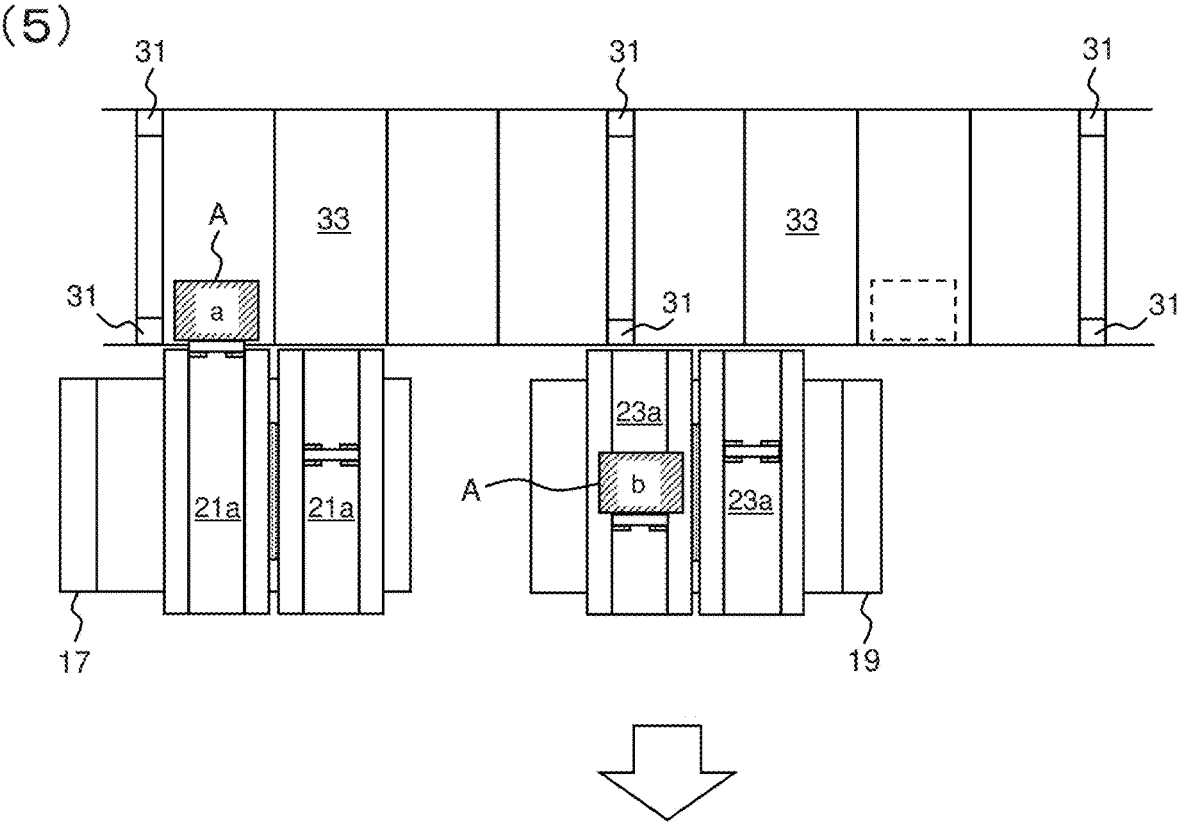
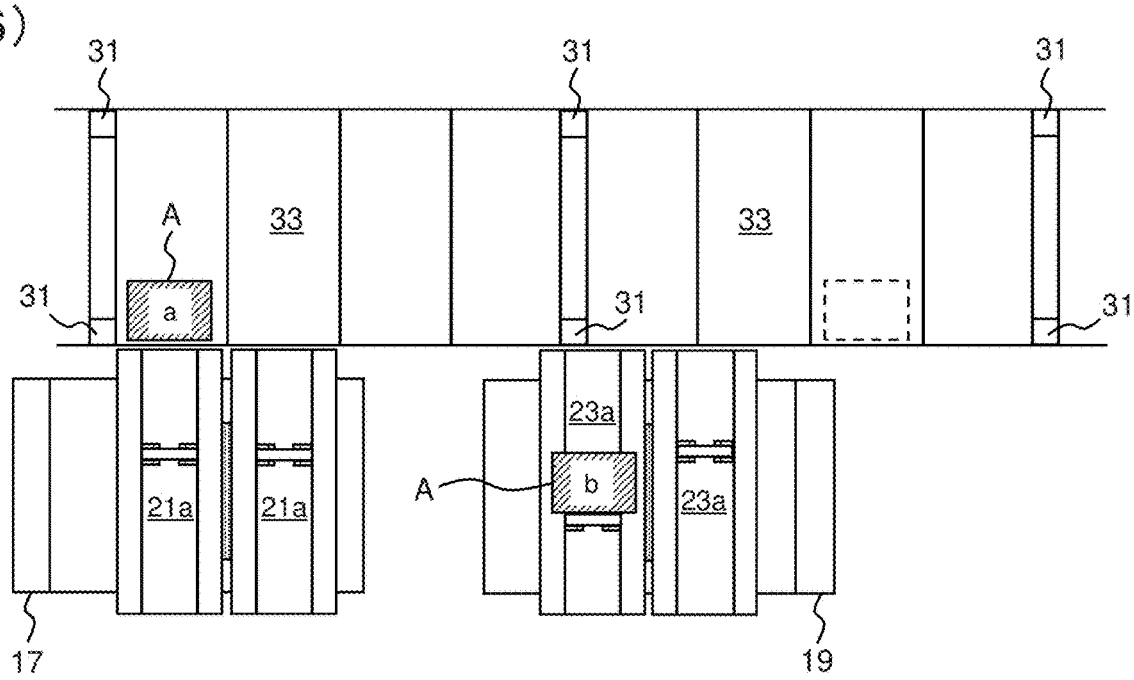
FIG. 10D

AUTOMATED WAREHOUSE AND CONVEYANCE DEVICE

BACKGROUND OF THE INVENTION

1. Field of the Invention

The present invention relates to an automated warehouse that stores and retrieves materials, and particularly to an automated warehouse in which a transfer device to transfer a material to and from placement units, is able to move in a traveling direction of a conveyance device.

2. Description of the Related Art

Conventionally, there is known an automated warehouse that includes a rack equipped with placement elements on which materials can be placed, and a conveyance device equipped with a transfer device that transfers a material to and from the placement elements and moves in a longitudinal direction of the rack.

In order to perform simultaneous transfer of the material to and from a plurality of placement elements in this automated warehouse, there is known a technique of arranging a plurality of transfer devices in the traveling direction on the conveyance device. Further in this conveyance device, there is known a technique of enabling an arrangement interval between the transfer devices to change by enabling some of the of transfer devices to move in the traveling direction with respect to a main body of the conveyance device (see, for example, Japanese Patent 2518763).

Thus, the arrangement interval between the transfer devices can be arbitrarily changed to correspond to the arrangement interval between the placement elements from or to which the material is to be transferred.

In a conventional automated warehouse, when a malfunction occurs in a driving part (for example, a motor and/or a drive belt) or the like of a mechanism that moves the transfer device in the traveling direction with respect to the main body of the conveyance device (referred to as a lateral movement mechanism) the entire conveyance device is stopped. Therefore, when a malfunction occurs in the lateral movement mechanism, the material cannot be conveyed also in a case where the lateral movement mechanism does not need to move the transfer device in the traveling direction with respect to the main body of the conveyance device. For instance, the material cannot be conveyed until an operator fixes the malfunction of the lateral movement mechanism.

SUMMARY OF THE INVENTION

Preferred embodiments of the present invention provide automated warehouses to perform continued conveyance of materials without using lateral movement mechanisms when the lateral movement mechanisms malfunction.

An automated warehouse according to a preferred embodiment of the present invention includes a conveyance device, a switch, a transfer controller, a first placement element, and a second placement element. The conveyance device includes a traveling device, a support carriage, a first transfer device, a second transfer device, and a lateral movement mechanism.

The traveling device travels in a first direction. The support carriage is provided to the traveling device.

The first transfer device is provided to the support carriage and transfers a material to and from the first placement element.

The second transfer device is located next to the first transfer device in the first direction on the support carriage, and transfers the material to and from the second placement element.

The lateral movement mechanism moves the first transfer device in the first direction on the support carriage.

The switch switches between a first state enabling lateral movement of the first transfer device and a second state disabling the lateral movement of the first transfer device.

The transfer controller controls the traveling device and/or the lateral movement mechanism based on current positions of the first transfer device and the second transfer device, and positions of the first placement element and the second placement element.

In addition, when the second state is selected by the switch, the transfer controller controls the traveling device to move the first transfer device and the second transfer device to positions corresponding to the first placement element and the second placement element without moving the first transfer device laterally.

In the automated warehouse described above, when the second state is selected by the switch, the transfer controller controls to move the first transfer device to the first placement element and to move the second transfer device to the second placement element without moving the first transfer device laterally.

Thus, even if the lateral movement mechanism is not able to move the first transfer device laterally due to malfunctions of the lateral movement mechanism, the first transfer device and the second transfer device are able to be moved to positions of target placement elements (the first placement element and the second placement element) by the movement of the traveling device, by selecting the second state by the switch. For example, when the lateral movement mechanism malfunctions, by disabling the lateral movement of the first transfer device (the second state) by the switching device, conveyance of a material is able to be continued by the movement of the traveling device until an operator fixes the malfunction of the lateral movement mechanism.

As such, in the automated warehouse described above, conveyance of the material is able to be continued without applying the lateral movement mechanism even if the lateral movement mechanism malfunctions. As a result, lowering of conveyance ability due to malfunctions of the lateral movement mechanism malfunctions is able to be reduced or prevented.

The automated warehouse described above may further include a first station and a second station.

The first station is a station where storage or retrieval of the material is performed, and the material is transferred between the first transfer device.

The second station is a station where storage or retrieval of the material is performed, and the material is transferred between the second transfer device.

The first station and the second station are spaced apart from each other by a distance that enables simultaneous transfer of the material to and from the first transfer device at an origin on the support carriage and the second transfer device.

Thus, even if the first transfer device is not able to not move laterally, the material is able to be transferred to and from the first station and the second station by the first transfer device and the second transfer device.

In addition, the above-mentioned stations are used more frequently than the placement elements.

On the other hand, a distance between the two placement elements differs according to positions of the selected placement elements. Therefore, even if the distance between the first transfer device and the second transfer device is set to a distance between two specific placement elements, when two placement elements other than the two specific placement elements are selected, there may be a case where simultaneous transfer of the material is not able to be performed by the first transfer device and the second transfer device, depending on the positions of the two selected placement elements.

Therefore, by matching the distance between the first station and the second station, which are used more frequently than the placement elements, with the distance between the first transfer device at the origin on the support carriage and the second transfer device, transfer of the material between the first station and the first transfer device and between the second station and the second transfer device is able to be performed simultaneously, even if the lateral movement mechanism malfunctions. As a result, lowering of efficiency of conveyance of the material is able to be reduced or prevented.

The automated warehouse described above may further include a lateral position detector, a storage, and a lateral movement controller.

The lateral position detector detects a position of the first transfer device on the support carriage.

The storage stores the origin of the first transfer device on the support carriage.

When the switch selects the first state, the lateral movement controller outputs a position detected by the lateral position detector, as lateral position information related to the position of the first transfer device on the support carriage. In contrast, when the switch selects the second state, the lateral movement controller outputs the origin stored in the storage, as the lateral position information. Accordingly, the transfer controller determines the position of the first transfer device based on the lateral position information.

Accordingly, when the switch selects the first state, i.e. when the lateral movement mechanism is working normally, a measured value of the position detected by the lateral position detector is able to be included as the position of the first transfer device on the support carriage.

In contrast, when the switch selects the second state, i.e. when the lateral movement mechanism malfunctions, it is determined that the first transfer device is at the origin, the malfunction of the lateral movement mechanism is ignored, and conveyance of the material is able to be continued.

The automated warehouse described above may further include a lateral movement controller. When the switch selects the first state, the lateral movement controller outputs lateral movement range information as a laterally movable range in which the first transfer device is able to move laterally. The lateral movement range information defines a range in which the first transfer device is able to move laterally from the origin on the support carriage.

In contrast, when the switch selects the second state, it outputs pseudo lateral movement range information as the laterally movable range described above. The pseudo lateral movement range information indicates that the first transfer device does not move laterally from the origin.

Accordingly, the transfer controller determines a controlled variable of the lateral movement mechanism based on the laterally movable range output from the lateral movement controller.

Thus, when the switch selects the first state, conveyance of the material is able to be continued by enabling the lateral movement of the first transfer device by the lateral movement mechanism.

In contrast, when the switch selects the second state, conveyance of the material is able to be continued by disabling the lateral movement of the first transfer device from the origin.

In addition, the activation/deactivation of the lateral movement function is able to be switched only be switching between the first state and the second state to switch the output value of the laterally movable range. As a result, the control regarding the lateral movement is able to be made uniform or common by a portion other than the switching of the activation/deactivation by switching of the laterally movable range.

When the distance between the first placement element to which the material is to be transferred and the second placement element is not within the laterally movable range, the transfer controller may determine to disable the lateral movement of the first transfer device.

Accordingly, the transfer controller transfers the material by one of the first transfer device and the second transfer device, and then controls the traveling device to travel to cause another transfer device to transfer the material.

Accordingly, when the first transfer device is not able to move laterally, or it is not sufficient only to move the first transfer device laterally by the lateral movement mechanism, the traveling device moves the first transfer device and the second transfer device in the traveling direction of the conveyance device, and conveyance of the material is able to be continued.

A conveyance device according to another preferred embodiment of the present invention transfers a material to and from a plurality of placement elements in an automated warehouse including a rack equipped with the plurality of placement elements provided in a first direction. The conveyance device includes a traveling device, a support carriage, a first transfer device, a second transfer device, a lateral movement mechanism, and a transfer controller. The traveling device travels in the first direction. The support carriage is provided to the traveling device. The first transfer device is provided to the support carriage and transfers the material to and from a first placement element of the rack. The second transfer device is located next to the first transfer device in the first direction on the support carriage and transfers the material to and from a second placement element of the rack. The lateral movement mechanism moves the first transfer device laterally in the first direction on the support carriage. The transfer controller controls the traveling device and/or the lateral movement mechanism based on current positions of the first transfer device and the second transfer device, and positions of the first placement element and the second placement element.

When a second state is selected, the transfer controller does not move the first transfer device laterally but controls the traveling device to move the first transfer device and the second transfer device to positions corresponding to the first placement element and the second placement element. The second state disables the lateral movement of the transfer device.

In the conveyance device described above, when the second state is selected, the transfer controller does not move the first transfer device laterally but performs the control to move the first transfer device to the first placement element and to move the second transfer device to the second placement element.

Accordingly, for example, the movement of the traveling device enables the first transfer device and the second transfer device to move to positions of target placement elements (the first placement element and the second placement element), even if the lateral movement mechanism malfunctions and the first transfer device is not able to move laterally. For example, by selecting the second state when the lateral movement mechanism malfunctions, conveyance of the material is able to be continued by moving the traveling device, until an operator fixes the malfunction of the lateral movement mechanism.

Accordingly, in the conveyance device described above, conveyance of the material is able to be continued without applying the lateral movement mechanism even if the lateral movement mechanism malfunctions. As a result, lowering of conveyance ability due to the malfunction of the lateral movement mechanism is able to be reduced or prevented.

The conveyance device described above may further include a lateral position detector, a storage, and a lateral movement controller. The lateral position detector detects position of the first transfer device on the support carriage. The storage stores an origin of the first transfer device on the support carriage. When a first state is selected, the lateral movement controller outputs a position detected by the lateral position detector as lateral position information regarding the position of the first transfer device on the support carriage. The first state enables the lateral movement of the first transfer device. In contrast, when the second state is selected, it outputs the origin stored in the storage as the lateral position information. Accordingly, the transfer controller determines the position of the first transfer device based on the lateral movement position information.

Accordingly, when the first state is selected, i.e., when the lateral movement mechanism is working normally, the measured value of the position detected by the lateral position detector is able to be provided as the position of the first transfer device on the support carriage. In contrast, when the second state is selected, i.e. when the lateral movement mechanism malfunctions, it is determined that the first transfer device is at the origin, the malfunction of the lateral movement mechanism is ignored, and conveyance of the material is able to be continued.

The conveyance device described above may further include a lateral movement controller. When the first state is selected, the lateral movement controller outputs lateral movement range information as a laterally movable range in which the first transfer device is able to move laterally. The first state enables the lateral movement of the first transfer device. The lateral movement range information defines a range that the first transfer device is able to move laterally from the origin on the support carriage of the first transfer device. In contrast, when the second state is selected, it outputs pseudo lateral movement range information as the laterally movable range. The pseudo lateral movement range information indicates that the first transfer device does not move laterally from the origin. Accordingly, the transfer controller determines a controlled variable of the lateral movement mechanism based on the laterally movable range output from the lateral movement controller.

Accordingly, when the first state is selected, the lateral movement mechanism enables the lateral movement of the first transfer device, and conveyance of the material is able to be continued. In contrast, when the second state is selected, the lateral movement of the first transfer device from the origin is disabled, and conveyance of the material is able to be continued.

In addition, the activation/deactivation of the lateral movement function is able to be switched only by switching between the first state and the second state to switch the output value of the laterally movable range. As a result, control regarding the lateral movement is able to be made uniform or common by a portion other than the switching of the activation/deactivation by switching of the laterally movable range.

In the conveyance device described above, when the distance between the first placement element to which the material is to be transferred and the second placement element is not within the laterally movable range, the transfer controller may determine to disable the lateral movement of the first transfer device. In contrast, it may transfer the material by one of the first transfer device and the second transfer device, and then control the traveling device to travel to cause the another transfer device to transfer the material.

Accordingly, when the first transfer device is not able to move laterally, or it is not sufficient only to move the first transfer device laterally by the lateral movement mechanism, the traveling device moves the first transfer device and the second transfer device in the traveling direction of the conveyance device, and conveyance of the material is able to be continued.

In automated warehouses according to the preferred embodiments of the present invention, even if the lateral movement mechanisms malfunction and is not able to move first transfer devices laterally, the first transfer devices and the second transfer devices are able to be moved to the positions of the target placement elements, and conveyance of materials is able to be continued.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 8A and 8B are diagrams schematically illustrating definition of a minimum value of an inter-transfer-device distance and a lateral movement range.

FIG. 10C is a diagram schematically illustrating a transfer operation of a material when the lateral movement is enabled in Operation Example 2 (Case 2).

FIG. 10D is a diagram schematically illustrating a transfer operation of a material when the lateral movement is enabled in Operation Example 2 (Case 3).

DETAILED DESCRIPTION OF THE PREFERRED EMBODIMENTS

Figure 1:
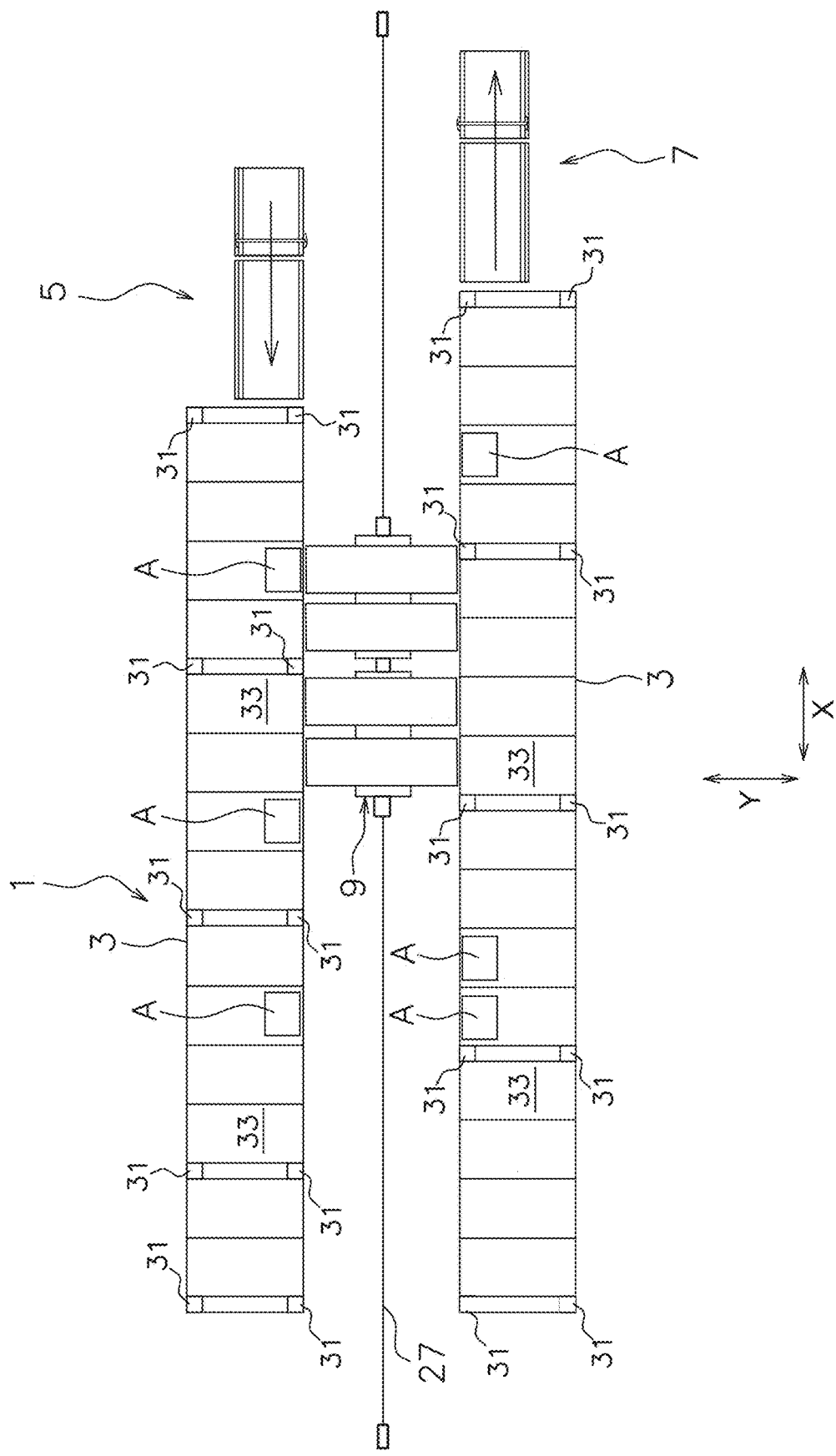
FIG. 1 is a diagram illustrating a structure of an automated warehouse according to a first preferred embodiment of the present invention.
Figure 2:
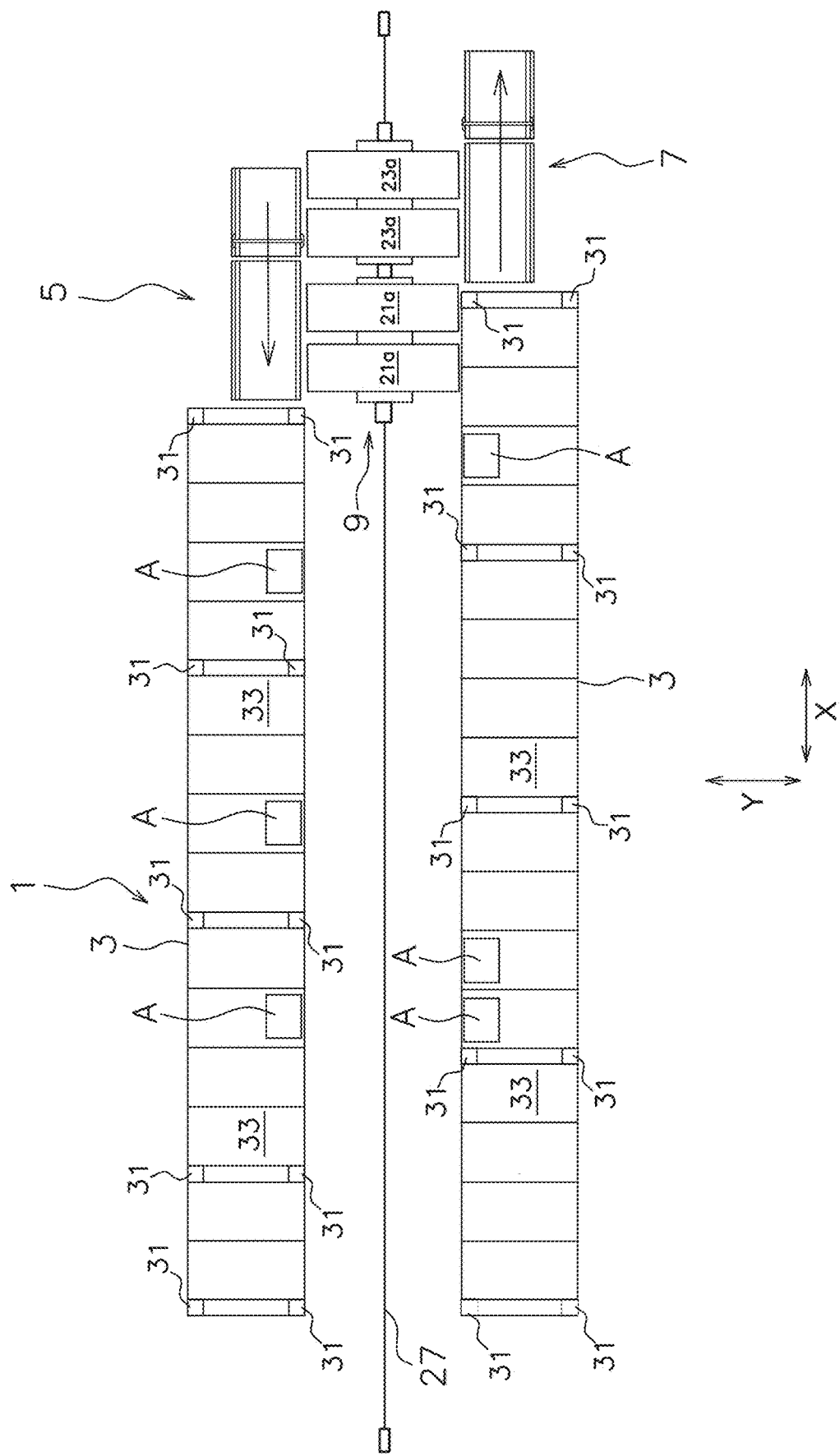
FIG. 2 is a diagram illustrating one example of a state where a transfer device has reached a storage and retrieval station.

With reference to FIGS. 1 and 2, an automated warehouse according to a preferred embodiment of the present invention is described. FIG. 1 is a diagram illustrating a structure of an automated warehouse 1. FIG. 2 is a diagram illustrating one example of a state where a transfer device has reached a storing and retrieval station.

The automated warehouse 1 is a facility in which materials A can be kept, store, and retrieved. Specifically, the automated warehouse 1 includes a rack 3, a storage station 5, a retrieval station 7, and a stacker crane 9.

The rack 3 is a facility that keeps materials A. As illustrated in FIG. 1, the rack 3 extends in a first direction (arrow X direction in FIG. 1). In this preferred embodiment, two racks 3 are provided in a second direction (arrow Y direction in FIG. 1), and a lower guide rail 27 (described later) is sandwiched between the two racks.

As illustrated in FIG. 1, the rack 3 includes columns 31 and shelves 33 (one example of placement elements).

The columns 31 extend in a height direction, and a pair of front and rear columns are provided in the second direction. In contrast, the columns 31 are provided with a predetermined interval in the first direction. Specifically, as illustrated in FIG. 1, for example, four shelves 33 are provided between the pair of columns 31 in the first direction. It should be noted that the number of the shelves 33 provided between the pair of columns 31 is not limited to four but can be an arbitrary number.

The shelves 33 define a plurality of cells on which the materials A are placed, and the plurality of cells are provided in the first direction. In addition, a plurality of shelves 33 are provided in the height direction of the rack 3.

The storage station 5 (one example of a first station or a second station) is a station where storage of the material A is performed. As illustrated in FIG. 1, the storage station 5 is located at an end in the first direction of one of the racks 3.

In the example illustrated in FIG. 1, the storage station 5 is located at the end on the paper's right side of the rack 3 provided on the paper's upper side of the lower guide rail 27 (described later).

The retrieval station 7 (one example of the second station or the first station) is a station where retrieval of the material A is performed. As illustrated in FIG. 1, the retrieval station 7 is located at the end in the first direction of the rack 3 on the opposite side of the rack 3 to which the storage station 5 is located.

In the example illustrated in FIG. 1, the retrieval station 7 is located at the end on the paper's right side of the rack 3 provided on the paper's lower side of the lower guide rail 27.

Each of the storage station 5 and the retrieval station 7 includes a conveyor that conveys the material A for storage and retrieval.

As illustrated in FIGS. 1 and 2, in this preferred embodiment, the storage station 5 and the retrieval station 7 are shifted from each other in the first direction. Specifically, as illustrated in FIG. 2, they are provided in the following positional relationship: when the stacker crane 9 reaches the end side in the first direction on which the storage station 5 and the retrieval station 7 are located, front hooks 21a (described later) of a first transfer device 21, at an origin O (described later) on a first hoist carriage 17 (described later), can move to the storage station 5, and front hooks 23a (described later) of a second transfer device 23 on a second hoist carriage 19 (described later) can move to the retrieval station 7.

In other words, the storage station 5 and the retrieval station 7 are spaced apart from each other in the first direction by a distance that enables simultaneous transfer of the material A with the first transfer device 21 at the origin O on the first hoist carriage 17 and the second transfer device 23. It should be noted that the origin O on the first hoist carriage 17 is defined, for example, as the end of the first hoist carriage 17 in the X direction (e.g. the end on the rear side). Alternatively, for example, the origin O may be a center of the first hoist carriage 17 in the X direction.

Accordingly, even if a lateral movement mechanism 25 (described later) malfunctions and the first transfer device 21 cannot move in the first direction (move laterally), transfer of the material A to and from the storage station 5 and the retrieval station 7 can be performed by the first transfer device 21 and the second transfer device 23.

Figure 3:
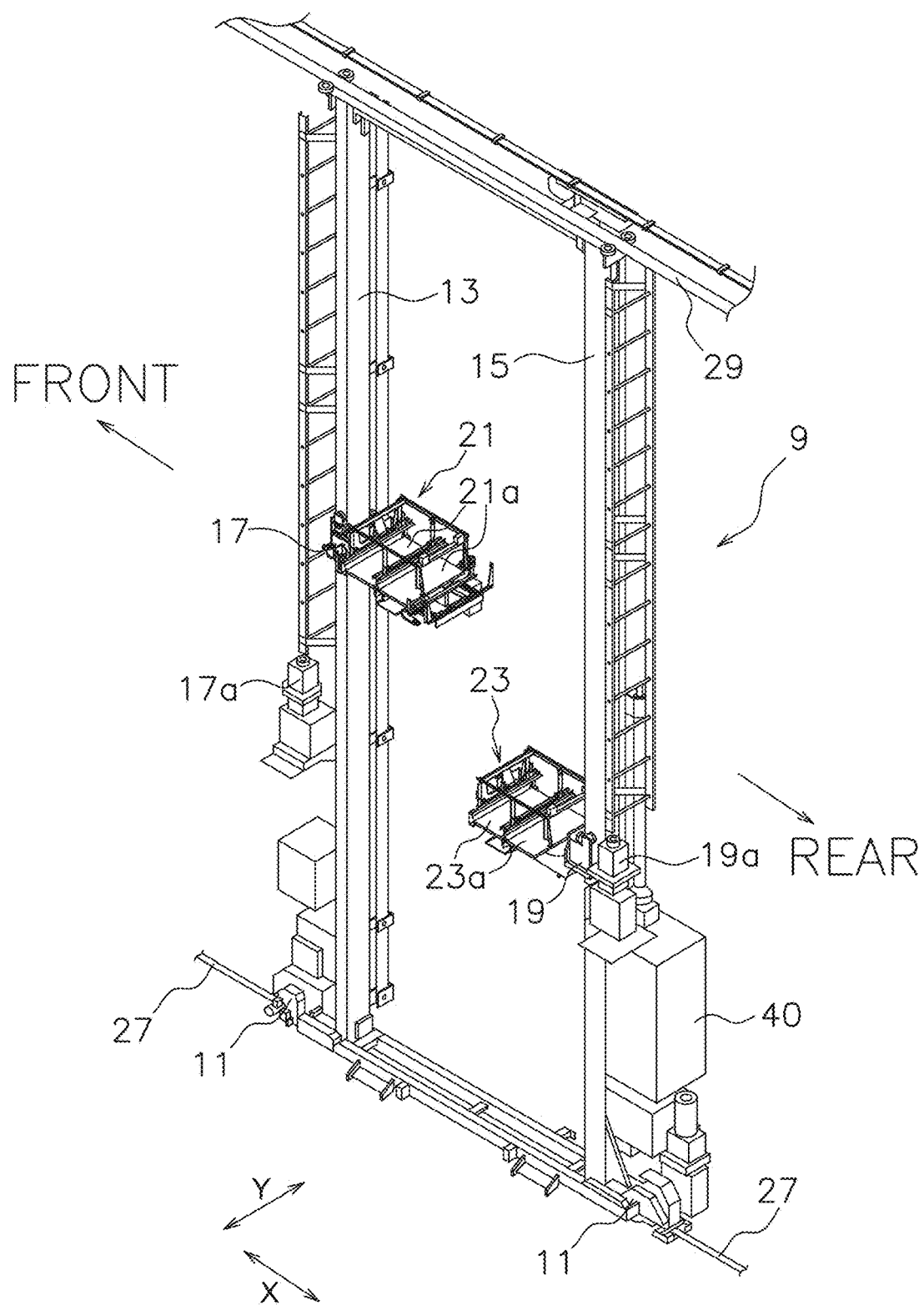
FIG. 3 is an overall view of a stacker crane.

The stacker crane 9 (one example of a conveyance device) is a device that moves in the first direction to convey the material A between the plurality of shelves 33, the storage station 5, and/or the retrieval station 7. With reference to FIG. 3, a structure of the stacker crane 9 is described. FIG. 3 is an overall view of the stacker crane 9.

The stacker crane 9 includes a traveling vehicle 11 (one example of a traveling device), a first vertical shaft 13, a second vertical shaft 15, the first hoist carriage 17 (one example of a support carriage), the second hoist carriage 19 (one example of a support carriage), the first transfer device 21, the second transfer device 23, the lateral movement mechanism 25, and a controller 40.

The traveling vehicle 11 is a device that can travel on the lower guide rail 27 extending in the first direction, and comprises wheels rotating on the lower guide rail 27 and a motor that rotates the wheels, for example.

The first vertical shaft 13 and the second vertical shaft 15 extend in the height direction from end portions of the traveling vehicle 11 in the first direction. The first vertical shaft 13 and the second vertical shaft 15 are connected to each other at upper portions, and the connecting portion is guided by an upper guide rail 29 (FIG. 3).

It should be noted that, in the following description, the side of the traveling vehicle 11 on which the first vertical shaft 13 is provided is defined as a front side in the first direction, and the side on which the second vertical shaft 15 is provided is defined as a rear side in the first direction.

The first hoist carriage 17 is supported by the first vertical shaft 13 provided to the traveling vehicle 11, and moves up and down in the height direction by moving along the first vertical shaft 13 by a first hoisting motor. The first transfer device 21 is mounted on the first hoist carriage 17 on its upper surface.

The second hoist carriage 19 is supported by the second vertical shaft 15 provided to the traveling vehicle 11 and moves up and down in the height direction by moving along the second vertical shaft 15 by a second hoisting motor 19a. The second transfer device 23 is mounted on the second hoist carriage 19 on its upper surface.

The first transfer device 21 is a device that is mounted on the first hoist carriage 17 to transfer the material A to the shelf 33 of the rack 3 or to transfer the material A between the storage station 5. The first transfer device 21 includes the pair of front hooks 21a that can independently move in the second direction. The front hooks 21a are a transfer device of a front hook type, which hooks the front of the material A.

Hereinafter, an operation of the first transfer device 21 when transferring the material A is described with respect to an operation in which the material A is transferred between the first transfer device 21 and the shelf 33 as an example.

When the first transfer device 21 transfers the material A to the shelf 33, the front hooks 21a supporting the material A are moved to the shelf 33 to place the material A supported by the front hooks 21a on the shelf 33 (release the supporting of the material A), and then the front hooks 21a are moved to the first hoist carriage 17.

On the other hand, for example, when transferring the material A from the storage station 5 to the first transfer device 21, the front hooks 21a are moved to the storage station 5, the front hooks 21a support the material A placed on the storage station 5, and then the front hooks 21a supporting the material A are moved to the first hoist carriage 17.

It should be noted that the number of the front hooks 21a mounted to the first transfer device 21 is not limited to two but can be an arbitrary number.

In addition, the first transfer device 21 is not limited to the front hook type transfer device. For example, other types of transfer devices including a hook that hooks the material A, a transfer device having a clamp that clamps the material A, or any other transfer device that transfers the material A to and from the shelf 33 or the like may be included.

As other type of transfer device having a hook that hooks the material A, there is a rear hook type transfer device that hooks the rear end of the material A, for example.

As described above, the first transfer device 21 is provided to store the material A. The first transfer device 21, equipped with a pair of the above-mentioned front hook type transfer devices or the above-mentioned rear hook type transfer devices, can also simultaneously perform storage and retrieval of the materials A between the first transfer device 21 and the shelf 33 or the like.

Other than that, as the first transfer device 21, a slide fork type transfer device that provides a fork on which the material A is able to be placed is also able to be provided.

The second transfer device 23 is a device that transfers the material A from the shelf 33 to the second transfer device 23 or transfers the material A between the retrieval station 7, and includes a pair of front hooks 23a that can extend and retract in the second direction.

When the second transfer device 23 transfers the material A from the shelf 33, the front hooks 23a are moved to the shelf 33, the front hooks 23a support the material A placed on the shelf 33, and then the front hooks 23a are moved to the second hoist carriage 19.

On the other hand, for example, when transferring the material A from the second transfer device 23 to the retrieval station 7, the front hooks 23a supporting the material A are moved to the retrieval station 7, the supported material A is placed on the retrieval station 7 (the supporting of the material A is released), and then the front hooks 23a are moved to the second hoist carriage 19.

It should be noted that, in this preferred embodiment, the second hoist carriage 19 is not provided with a mechanism corresponding to the lateral movement mechanism 25, and hence the second transfer device 23 does not move in the first direction on the second hoist carriage 19.

In addition, the second transfer device 23 retrieves the material A. The second transfer device 23, equipped with a pair of the above-mentioned front hook type transfer devices or the above-mentioned rear hook type transfer devices, can also simultaneously perform storage and retrieval of the materials A between the second transfer device 23 and the shelf 33 or the like.

As described above, the first transfer device 21 that can be moved laterally by the lateral movement mechanism 25 stores the material A, and the second transfer device 23 that does not move laterally retrieves the material A. This is because the shelf 33 from which the material A are retrieved is determined based on a retrieval command, while the shelf 33 to which the material A is stored can be any shelf 33 that can store the material A.

In other words, by determining the shelf 33 from which the material A is retrieved based on the retrieval command and by determining that the shelf 33 to which the material A is stored is the shelf 33 adjacent to or in a vicinity of the shelf 33 from which the material A is retrieved, the possibility of the simultaneous transfer by the first transfer device 21 and the second transfer device 23 is able to be increased.

The lateral movement mechanism 25 is a mechanism that moves the first transfer device 21 in the first direction on the first hoist carriage 17. In the following description, "lateral movement" means the movement of the first transfer device 21 in the first direction on the first hoist carriage 17.

Figure 4:
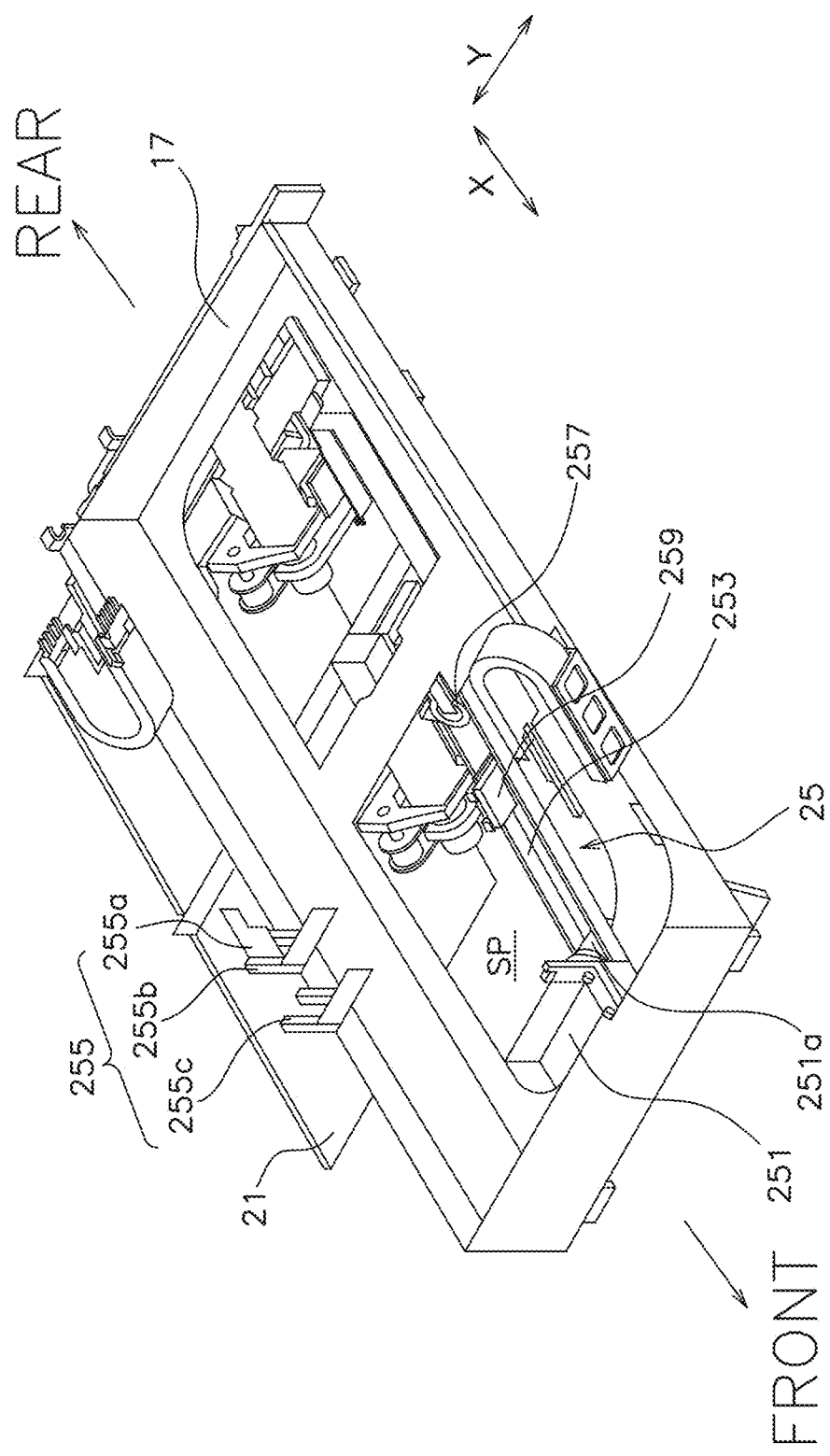
FIG. 4 is a diagram of a first hoist carriage viewed from below.

With reference to FIG. 4, a detailed structure of the lateral movement mechanism 25 is described. FIG. 4 is a diagram of the first hoist carriage viewed from below. As illustrated in FIG. 4, the lateral movement mechanism 25 includes a lateral movement motor 251, a lateral movement belt 253, and a position determiner 255.

The lateral movement motor 251 is attached to the front side end in the first direction in a space SP formed on the front side of the first hoist carriage 17 in the first direction. A first pulley 251a is attached to a rotation shaft of the lateral movement motor 251. The first pulley 251a rotates about a second direction axis when the lateral movement motor 251 rotates.

In addition, an encoder 251b (FIG. 5) (one example of a lateral position detector) that measures an amount of a rotation of the rotation shaft is attached to the rotation shaft of the lateral movement motor 251. When a rotation angle of the rotation shaft of the lateral movement motor 251 changes, the encoder 251*b* outputs a corresponding pulse signal. By counting the number of pulse signals output from the encoder 251*b*, the amount of the rotation of the rotation shaft (rotation angle) can be measured.

In addition, the amount of the rotation of the rotation shaft of the lateral movement motor 251 corresponds to an amount of a lateral movement of the first transfer device 21 on the first hoist carriage 17, and hence a position of the first transfer device 21 on the first hoist carriage 17 can be measured based on a measured value of the number of pulses output from the encoder 251*b*.

In the space SP where the lateral movement motor 251 is attached, a second pulley 257 is attached to the rear side end in the first direction. The second pulley 257 rotates about the second direction axis.

The lateral movement belt 253 is a belt bridged between the first pulley 251*a* and the second pulley 257. A connector 259 is attached to the lateral movement belt 253 at a portion between the first pulley 251*a* and the second pulley 257. The connector 259 is connected also to the first transfer device 21 to connect the lateral movement belt 253 with the first transfer device 21.

In the structure described above, when the lateral movement motor 251 rotates the first pulley 251*a*, the connector 259 attached to the lateral movement belt 253 moves in the first direction.

Since the first transfer device 21 is connected to the connector 259, the first transfer device 21 moves laterally on the first hoist carriage 17 in accordance with the movement of the connector 259 in the first direction.

The position determiner 255 determines information regarding the position of the first transfer device 21 in the first direction on the first hoist carriage 17. The position determiner 255 includes a detector 255*a*, a first sensor 255*b*, and a second sensor 255*c*.

The detector 255*a* extends along a predetermined length in the first direction and extends downward from the second direction side of the first transfer device 21. Adjacent to or in a vicinity of at least one side surface of the first hoist carriage 17 in the second direction, the detector 255*a* extends to a predetermined height position of the first hoist carriage 17.

In addition, the detector 255*a* moves in the first direction in accordance with the lateral movement of the first transfer device 21.

The first sensor 255*b* is attached on the surface of the side where the detector 255*a* extends downward, out of surfaces of the first hoist carriage 17 in the second direction. The first sensor 255*b* detects the detector 255*a* that moves in the first direction in accordance with the lateral movement of the first transfer device 21.

The second sensor 255*c* is attached in front of the first sensor 255*b* in the first direction on the surface on which the first sensor 255*b* of the first hoist carriage 17 is attached. The second sensor 255*c* detects the detector 255*a* that moves in the first direction in accordance with the lateral movement of the first transfer device 21.

The first sensor 255*b* and the second sensor 255*c* are photo-electronic sensors that detect interruption or reflection of light by the detector 255*a*, for example.

When the detector 255*a* is detected by the first sensor 255*b*, the position determiner 255 having the structure described above determines information regarding a position of the first transfer device 21, which indicates that the first transfer device 21 is within a laterally movable range (referred to as a lateral movement range) on the first hoist carriage 17.

On the other hand, when the detector 255*a* is detected by the second sensor 255*c*, the position determiner 255 determines information regarding a position of the first transfer device 21, which indicates that the first transfer device 21 is at the origin O on the first hoist carriage 17.

Using the position determiner 255 having the structure described above, information regarding a position of the first transfer device 21 on the first hoist carriage 17 is able to be determined not only by the encoder 251*b* but also by whether or not the detector 255*a* is detected by the first sensor 255*b* and the second sensor 255*c*. As a result, for example, even if the encoder 251*b* malfunctions and a position of the first transfer device 21 cannot be measured by the encoder 251*b*, whether or not the first transfer device 21 is in the lateral movement range is able to be detected by detecting the detector 255*a* with the first sensor 255*b*. Whether or not the first transfer device 21 is at the origin O is also able to be determined by detecting the detector 255*a* with the second sensor 255*c*.

In addition, since the information regarding a position of the first transfer device 21 on the first hoist carriage 17 is able to be determined not only by the encoder 251*b* but also by whether or not the detector 255*a* is detected by the first sensor 255*b* and the second sensor 255*c*, whether or not the encoder 251*b* malfunctions is able to be determined.

Specifically, for example, when a measured value of the position of the first transfer device 21 by the encoder 251*b* indicates not being within the lateral movement range while the detector 255*a* is detected by the first sensor 255*b*, it can be determined that the encoder 251*b* has a malfunction, and this malfunction can be notified.

In addition, for example, when a measured value of the position of the first transfer device 21 by the encoder 251*b* does not indicate being at the origin O while the detector 255*a* is detected by the second sensor 255*c*, it can be determined that the encoder 251*b* has a malfunction, and this malfunction can be notified.

Furthermore, since the position determiner 255 can determine whether or not the first transfer device 21 is in the lateral movement range, and whether or not the first transfer device 21 is at the origin O, the first transfer device 21 is able to be prevented from colliding with a mechanical stopper (described later).

It should be noted that a front mechanical stopper (not shown) is attached to the first hoist carriage 17, in front of the position determiner 255 in the first direction. The front mechanical stopper is a mechanical stopper that prevents the first transfer device 21 from moving forward in the first direction beyond the lateral movement range.

In addition, a rear mechanical stopper (not shown) is attached back of the position determiner 255 in the first direction. The rear mechanical stopper is a mechanical stopper that prevents the first transfer device 21 from moving backward in the first direction beyond the lateral movement range.

As the first transfer device 21 can be moved laterally by the lateral movement mechanism 25 having the structure described above, even if a distance between the shelves 33 is different depending on a position in the rack 3, the transfer of a material A by the first transfer device 21 and the transfer of another material A by the second transfer device can be simultaneously performed, by moving the stacker crane 9 to a vicinity of the target shelves 33 where the materials A are transferred and moving the first transfer device 21 laterally in this position to adjust the position of the first transfer device 21 on the first hoist carriage 17 to deal with the distance between the shelves 33. For example, the distance between the two shelves 33 in a case where the column 31 exists between the two shelves 33 is different from that in a case where the column 31 does not exist between them. However, since the distance between the first transfer device 21 and the second transfer device 23 can be adjusted by enabling the lateral movement of the first transfer device, a difference of the distance between the two shelves 33 due to the presence or absence of the column 31 between the two shelves 33 is able to be compensated.

In addition, for example, even if the two target shelves 33 where materials A are transferred sandwich the column 31, the transfer of materials A between the two shelves 33 can be performed, by performing simultaneously the transfer of a material A by the first transfer device and the transfer of another material A.

Furthermore, the distance between the shelves 33 may differ depending on a position in the rack 3 due to assembly accuracy and/or aging of the rack 3. For example, the distance between the shelves 33 is different depending on a height position of the rack 3 at which the shelves 33 are provided. Also, the transfer of a material A by the first transfer device 21 and the transfer of another material A by the second transfer device can be performed simultaneously by moving the first transfer device 21 laterally to adjust the position of the first transfer device 21 on the first hoist carriage 17 to deal with the distance between the shelves 33.

The controller 40 is a computer system including a CPU, a storage device (for example, a RAM, a ROM, a hard disk, an SSD, and etc.), and various interfaces, and controls the stacker crane 9.

Figure 5:
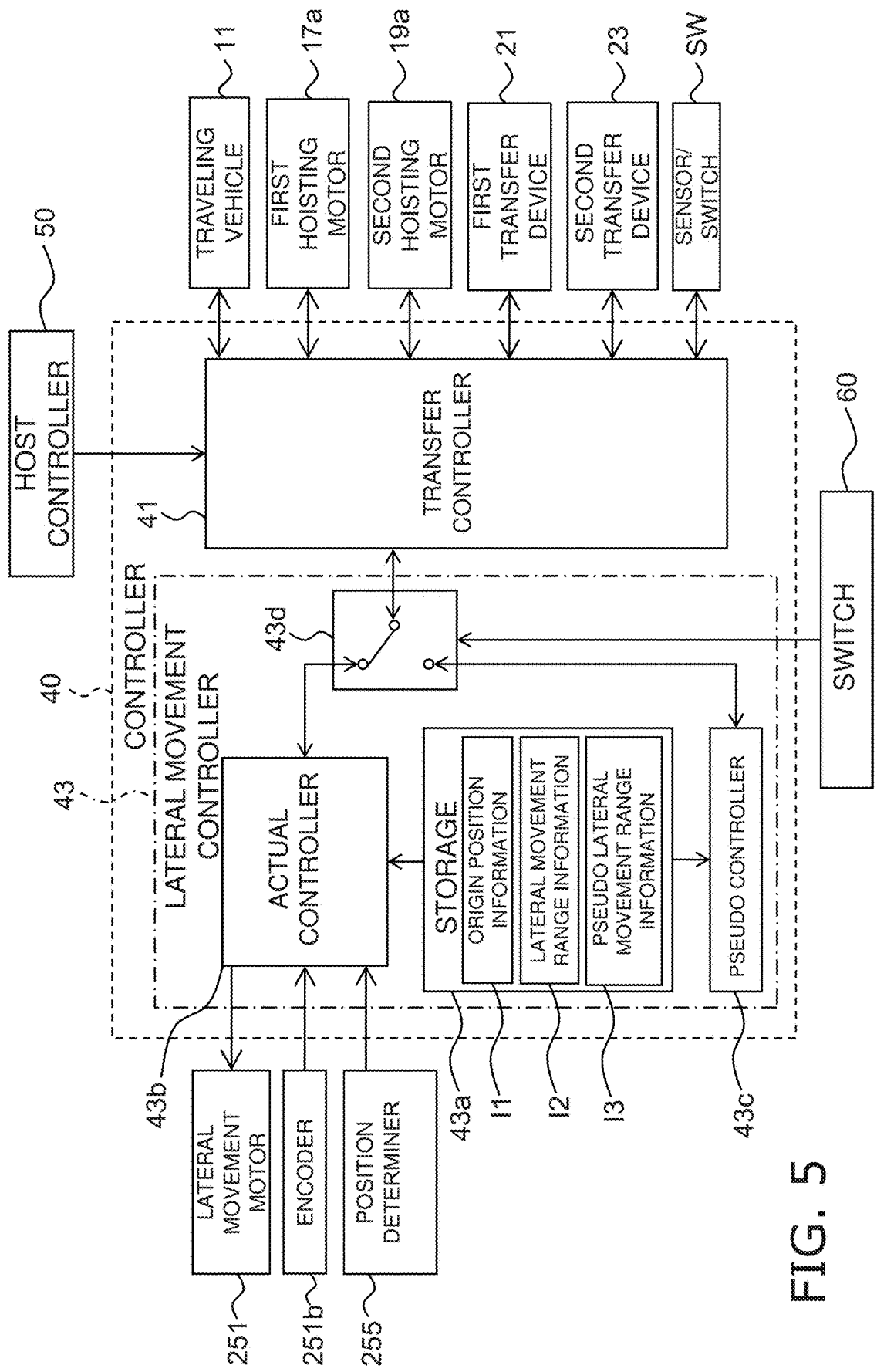
FIG. 5 is a diagram illustrating a control structure of a controller.

Hereinafter, with reference to FIG. 5, a control structure of the controller 40 is described. FIG. 5 is a diagram illustrating a control structure of the controller 40.

The controller 40 includes a transfer controller 41 and a lateral movement controller 43. It should be noted that functions of the above-mentioned elements and devices included in the controller 40 may be implemented by a program that can be executed by a computer system defining the controller 40. In addition, the program may be stored in the storage device of the controller 40.

The transfer controller 41 receives a transfer command of the material A from a host controller 50 that integrally controls the transfer of the material A in the automated warehouse 1, calculates driving commands of the traveling vehicle 11, the first hoisting motor 17a, the second hoisting motor 19a, the first transfer device 21, and the second transfer device 23, based on the received transfer command, and outputs the calculated droving commands to the corresponding devices.

Accordingly, the transfer controller 41 can control the travel of the traveling vehicle 11 in the first direction, moving up and down of the first hoist carriage 17 and the second hoist carriage 19, and transferring the material A by the first transfer device 21 and the second transfer device 23, based on the transfer command received from the host controller 50.

In addition, the transfer controller 41 calculates a driving command of the lateral movement motor 251 based on the transfer command received from the host controller 50, and outputs the same to the lateral movement controller 43.

Furthermore, the transfer controller 41 determines states of various sensors and/or switches SW provided to the stacker crane 9. In addition, the transfer controller 41 performs control based on the states of various sensors and/or switches SW.

Specifically, the transfer controller 41 determines current positions from a sensor that detects a position of the stacker crane 9 in the traveling direction, a sensor that detects a position of the first hoist carriage 17 in the height direction, and a sensor that detects a position of the second hoist carriage 19 in the height direction.

The lateral movement controller 43 controls the lateral movement of the first transfer device 21 by controlling the lateral movement motor 251 of the lateral movement mechanism 25. In addition, the lateral movement controller 43 outputs to the transfer controller 41 information regarding the position of the first transfer device 21 on the first hoist carriage 17 (referred to as lateral position information), and information regarding the lateral movement range of the first transfer device 21.

The lateral movement controller 43 includes a storage 43a, an actual controller 43b, a pseudo controller 43c, and a control switch 43d.

The storage 43a is a portion of a storage area allocated in the storage device of the controller 40 and stores various information regarding the lateral movement control. Specifically, the storage 43a stores origin position information I1, lateral movement range information I2, and pseudo lateral movement range information I3.

The origin position information I1 is information regarding the origin O of the first transfer device 21 on the first hoist carriage 17. The origin position information I1 can be a measured value of the number of pulses output from the encoder 251b when the first transfer device 21 is at the origin O, for example.

Other than that, the origin position information I1 can be a coordinate value (e.g. zero) in the first direction with respect to the first hoist carriage 17.

The lateral movement range information I2 is information about a range that the first transfer device 21 can move laterally from the origin O when the first transfer device 21 and the lateral movement mechanism 25 work normally. The lateral movement range information I2 can be a maximum distance that the first transfer device 21 can move laterally from the origin O, for example.

Other than that, the lateral movement range information I2 can be a measured value of the number of pulses output from the encoder 251b when the first transfer device 21 moves laterally from the origin O by the above-mentioned maximum distance.

Furthermore, the lateral movement range information I2 can be a value calculated by converting the maximum distance that the first transfer device 21 can move laterally from the origin O into the number of pulses.

The pseudo lateral movement range information I3 is information indicating that the first transfer device 21 does not move laterally from the origin O when the first transfer device 21 and/or the lateral movement mechanism 25 malfunction. The pseudo lateral movement range information I3 can be "0" value, for example.

Other than that, the pseudo lateral movement range information I3 can be a measured value of the number of pulses output from the encoder 251b when the first transfer device 21 is at the origin O.

The actual controller 43b controls the lateral movement motor 251 based on the driving command of the lateral movement motor 251 input from the transfer controller 41 via the control switch 43d.

In addition, when a first state (described later) is selected by a switch 60 and the transfer controller 41 commands to output the laterally movable range that is a range in which the first transfer device 21 can move laterally, the actual controller 43b outputs to the transfer controller 41 the lateral movement range information I2 stored in the storage 43a, as the laterally movable range.

On the other hand, when the first state (described later) is selected by the switch 60 and the transfer controller 41 commands to output the lateral movement position information, the actual controller 43b outputs to the transfer controller 41 a current measured value of the number of pulses of the encoder 251b, and/or a value calculated by converting the measured value into a coordinate value in the first direction, as the lateral movement position information.

The actual controller 43b further monitors a position of the first transfer device 21 on the first hoist carriage 17 based on the outputs from the first sensor 255b and the second sensor 255c of the position determiner 255.

Specifically, when the detector 255a is not detected by the first sensor 255b, the actual controller 43b informs the transfer controller 41 that the first transfer device 21 malfunctions.

In addition, when the detector 255a is detected by the second sensor 255c, the actual controller 43b determines that the first transfer device 21 is at the origin O.

It should be noted that the actual controller 43b may determine a measured value of the number of pulses of the encoder 251b at timing when the detector 255a is detected by the second sensor 255c, as a new origin O of the first transfer device 21. Accordingly, the actual controller 43b may update the origin position information I1 stored currently in the storage 43a with the measured value (or the converted value of the measured value into the coordinate value).

Further, when the measured value of the encoder 251b defines a predetermined value of the origin O (without update), while the detector 255a is not detected by the second sensor 255c, the actual controller 43b may determine that the encoder 251b (a measured value thereof) malfunctions, and may notify that the encoder 251b malfunctions.

The pseudo controller 43c performs "pseudo" control concerning the lateral movement. Specifically, it performs the following pseudo control.

When a second state (described later) is selected by the switch 60 and the transfer controller 41 commands to output the laterally movable range, the pseudo controller 43c outputs to the transfer controller 41 the pseudo lateral movement range information I3 stored in the storage 43a, as the laterally movable range. In other words, when the second state (described later) is selected by the switch 60, the pseudo controller 43c outputs information that the laterally movable range of the first transfer device 21 is only the origin O, i.e. that the laterally movable range is zero.

On the other hand, when the second state (described later) is selected by the switch 60 and the transfer controller 41 commands to output the lateral position information, it outputs to the transfer controller 41 the origin position information I1 stored in the storage 43a, as the lateral position information. In other words, when the second state (described later) is selected by the switch 60, the pseudo controller 43c outputs information that the first transfer device 21 is always at the origin O on the first hoist carriage 17.

In addition, the pseudo controller 43c informs that the first sensor 255b and the second sensor 255c of the position determiner 255 are outputting normal detection results.

In other words, when the second state (described later) is selected by the switch 60, the pseudo controller 43c performs output of information indicating that the first transfer device 21 and/or the lateral movement mechanism 25 are working normally in a state where the first transfer device 21 is stopped at the origin O, as the pseudo control.

The control switch 43d determines whether to connect the transfer controller 41 with the actual controller 43b or to connect the transfer controller 41 with the pseudo controller 43c, based on the state set by the switch 60.

The switch 60 sets (selects) by switching between the first state in which the lateral movement of the first transfer device 21 is enabled and the second state in which the lateral movement of the first transfer device 21 is disabled. In this preferred embodiment, the switch 60 is a remote controller including a selector switch, for example.

In another preferred embodiment, the switch 60 may automatically determine whether or not the lateral movement mechanism 25 and/or the first transfer device 21 malfunction, and automatically set by switching between the first state and the second state based on the determination.

When the switch 60 is set to the state in which the lateral movement of the first transfer device 21 is enabled (referred to as the first state), the control switch 43d connects the transfer controller 41 with the actual controller 43b. In other words, the signals (for example, the actuation command) output from the transfer controller 41 are input to the actual controller 43b. Further, the signals (for example, the lateral position information and the laterally movable range) output from the actual controller 43b are input to the transfer controller 41.

On the other hand, when the switch 60 is set to the state in which the lateral movement of the first transfer device 21 is disabled (referred to as the second state), the control switch 43d connects the transfer controller 41 with the pseudo controller 43c. In other words, the signals output from the transfer controller 41 are input to the pseudo controller 43c. Further, the signals output from the pseudo controller 43c are input to the transfer controller 41.

It should be noted that, in the above description and FIG. 5, the function of the control switch 43d is described with the assumption that the control switch 43d is hardware, for example, a switch, but the function is the control switch 43d can also be implemented as software.

For instance, the function of the control switch 43d may be implemented as software by a conditional branch that branches processes depending on the set state of the switch 60. Specifically, the control switch 43d can be implemented by the conditional branch, in which the process of the actual controller 43b is performed when the switch 60 is set to the first state, and the process of the pseudo controller 43c is performed when it is set to the second state.

It should be noted that, when the lateral movement mechanism 25 and/or the first transfer device 21 malfunction and the second state is selected by the switch 60, the transfer of the material A is temporarily stopped first, and the first transfer device 21 is moved to the origin O on the first hoist carriage 17. In this preferred embodiment, this movement of the first transfer device 21 to the origin O is performed by an operator. After that, the second state is selected by the switch 60, and the transfer of the material A is resumed.

In addition, a mechanism other than the lateral movement mechanism 25 is able to be provided to the first hoist carriage 17, and the mechanism can automatically move the first transfer device 21 to the origin O.

Figure 6:
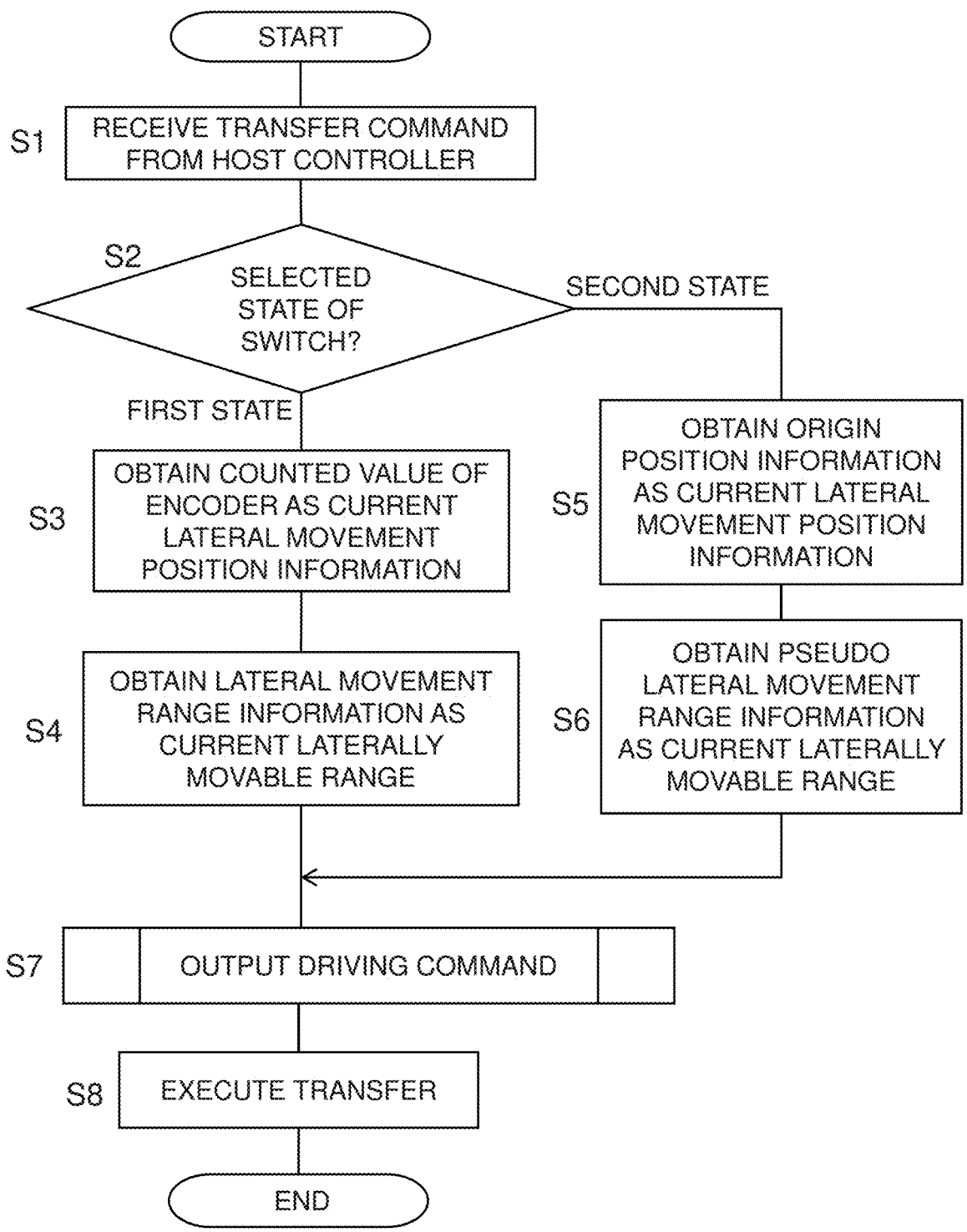
FIG. 6 is a flowchart illustrating an operation of the automated warehouse according to the first preferred embodiment of the present invention.
Figure 7:
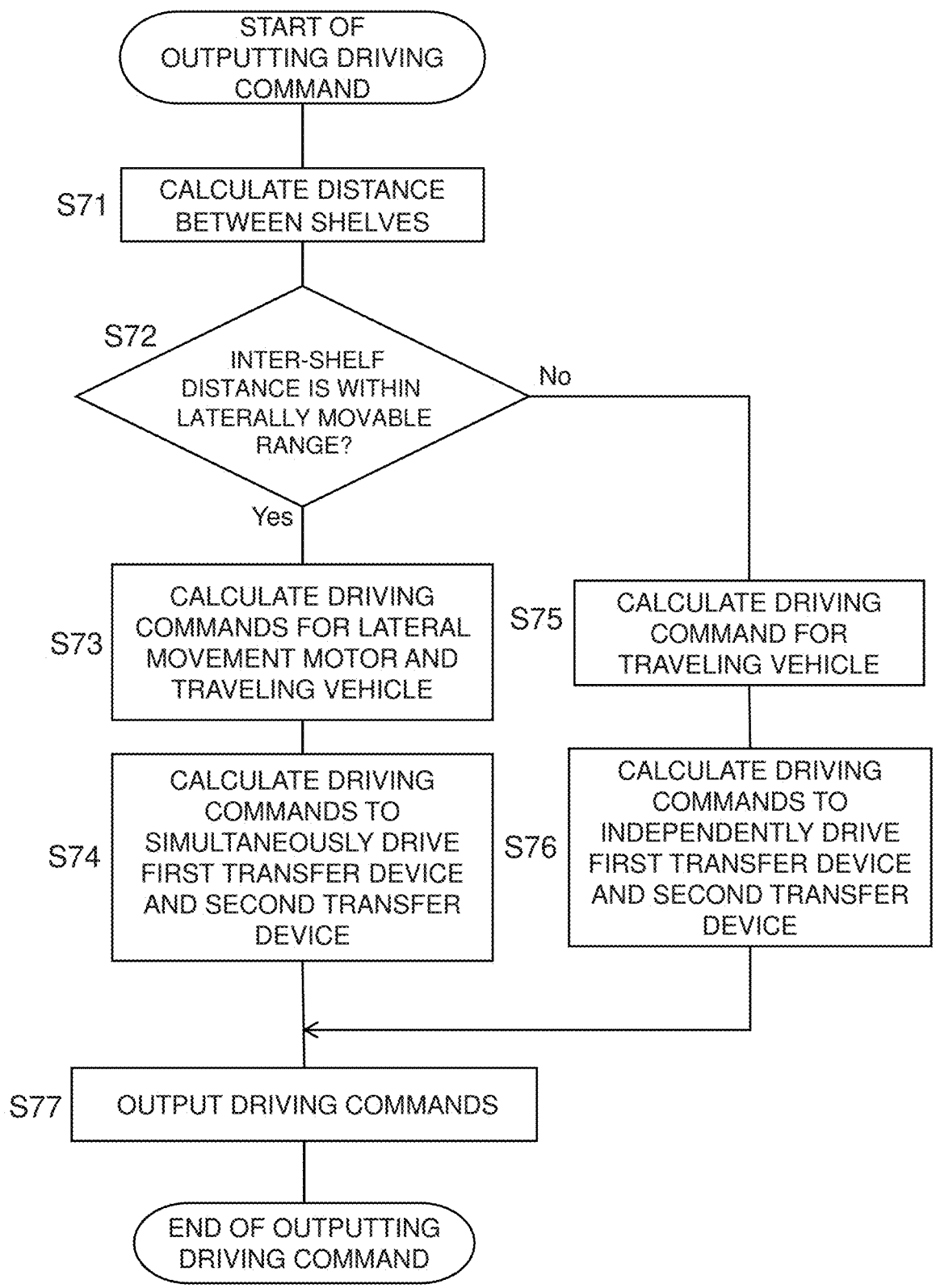
FIG. 7 is a flowchart illustrating a calculation operation of a driving command.

Hereinafter, with reference to FIGS. 6 and 7, an operation of the automated warehouse 1 having the above-mentioned structure according to the first preferred embodiment is described. FIG. 6 is a flowchart illustrating an operation of the automated warehouse 1 according to the first preferred embodiment. FIG. 7 is a flowchart illustrating a calculation operation of the driving command.

The following describes an operation in which, when the controller 40 receives one transfer command from the host controller 50, the controller 40 moves the first transfer device 21 and the second transfer device 23 to a position of the shelf 33 as a transfer destination, the storage station 5, or the retrieval station 7, and transfers the material A between the shelf 33 as the transfer destination or the station and the first transfer device 21 and the second transfer device 23.

In addition, in the following description, the received transfer command is a command to perform simultaneous transfer of the materials A to and from the shelves 33 by the first transfer device 21 and the second transfer device 23 (simultaneous storage and retrieval of the materials A). In addition, for simple description, a storing destination to which the material A is stored by the first transfer device 21 is a single shelf 33 (a first shelf as one example of a first placement element), and that a retrieving source from which the material A is retrieved by the second transfer device 23 (a second shelf as one example of a second placement element) is also a single shelf 33.

In Step S1, the transfer controller 41 receives the transfer command from the host controller 50, and calculates the driving commands of the traveling vehicle 11, the first hoisting motor 17a, and the second hoisting motor 19a, and/or the lateral movement motor 251, based on the received transfer command.

When calculating the driving commands, the transfer controller 41 first determines current positions of the stacker crane 9, the first hoist carriage 17, and the second hoist carriage 19 from the sensors or the like provided to the stacker crane 9.

In addition, the transfer controller 41 determines current lateral position information and the laterally movable range from the lateral movement controller 43.

Specifically, when the first state is selected by the switch 60 ("first state" in Step S2), the actual controller 43b of the lateral movement controller 43 is connected to the transfer controller 41.

Therefore, in Step S3, the transfer controller 41 determines, from the lateral movement controller 43, the current measured value of the number of pulses of the encoder 251b, i.e., the measured value of the position of the first transfer device 21 on the first hoist carriage 17 detected by the encoder 251b, as the current lateral position information.

In addition, in Step S4, the transfer controller 41 determines, from the lateral movement controller 43, the lateral movement range information I2 stored in the storage 43a, i.e. a predetermined set value other than zero of the laterally movable range of the first transfer device 21, as the current laterally movable range.

On the other hand, when the second state is selected by the switch 60 ("second state" in Step S2), the pseudo controller 43c of the lateral movement controller 43 is connected to the transfer controller 41.

Therefore, in Step S5, the transfer controller 41 determines, from the lateral movement controller 43, the origin position information I1, i.e., the origin O of the first transfer device 21 on the first hoist carriage 17, as the current lateral position information.

In addition, in Step S6, the transfer controller 41 determines, from the lateral movement controller 43, the pseudo lateral movement range information I3 stored in the storage 43a, i.e., the laterally movable range when the first transfer device 21 does not move laterally from the origin O, as the current laterally movable range.

As described above, after determining the current position of the stacker crane 9, the current position of the first hoist carriage 17, the current position of the second hoist carriage 19, the current lateral position information, and the current laterally movable range, the transfer controller 41 calculates the driving commands of the individual portions of the stacker crane 9 based on the received transfer command, and outputs the same on Step S7. Specifically, in accordance with the flowchart illustrated in FIG. 7, it calculates the driving commands and outputs the same.

When calculating the driving command, the transfer controller 41 first determines whether or not to move the first transfer device 21 laterally. In this determination, the transfer controller 41 first calculates a distance between the first shelf and the second shelf (referred to as an inter-shelf distance) in Step S71.

The inter-shelf distance can be calculated, for example, as a difference (an absolute value of a difference) between information regarding the position of the first shelf in the first direction (for example, a coordinate value of the first shelf) and information regarding the position of the second shelf in the first direction (for example, a coordinate value of the second shelf).

The information regarding the position of the shelf 33 in the first direction is stored in advance in the storage device of the controller 40 or the like, for example.

Next, in Step S72, the transfer controller 41 determines whether or not the inter-shelf distance is within the laterally movable range. Specifically, when the inter-shelf distance is less than or equal to a maximum value of the distance between the first transfer device 21 and the second transfer device 23 (referred to as an inter-transfer-device distance), and when the inter-shelf distance is more than or equal to a minimum value of the inter-transfer-device distance, it determines that the inter-shelf distance is within the laterally movable range.

The minimum value of the inter-transfer-device distance can be the inter-transfer-device distance when the first transfer device 21 is at the origin O. In addition, the maximum value of the inter-transfer-device distance can be calculated as the sum of the minimum value of the inter-transfer-device distance and the laterally movable range determined in Step S4 or S6. In addition, when the second state is selected by the switch 60, the first transfer device 21 cannot move laterally from the origin O, and hence the maximum value of the inter-transfer-device distance is equal or substantially equal to the minimum value of the inter-transfer-device distance.

The inter-transfer-device distance when the first transfer device 21 is at the origin O (the minimum value of the inter-transfer-device distance) is measured in advance and is stored in the storage device of the controller 40 or the like.

When the inter-shelf distance is within the laterally movable range ("Yes" in Step S72), the transfer controller 41 determines to move the first transfer device 21 laterally.

Accordingly, the transfer controller 41 moves the first transfer device 21 to a position corresponding to the position of the first shelf in the first direction by the lateral movement of the first transfer device 21 and the travel of the stacker crane 9, for example. In addition, it moves the second transfer device 23 to a position corresponding to the position of the second shelf in the first direction by the travel of the stacker crane 9.

Furthermore, it moves the first transfer device 21 to a height position corresponding to the height position of the first shelf by moving up and down the first hoist carriage 17. Furthermore, it moves the second transfer device 23 to a height position corresponding to the height position of the second shelf by moving up and down the second hoist carriage 19.

Moreover, the first transfer device 21 is able to be moved to a position corresponding to the position of the first shelf in the first direction only by the lateral movement of the first transfer device 21 or by the travel of the stacker crane 9.

Specifically, for example, in Step S73, the transfer controller 41 calculates the driving command of the lateral movement motor 251 to move the first transfer device 21 to a position corresponding to the position of the first shelf in the first direction by the lateral movement, based on a difference between the inter-shelf distance and the current inter-transfer-device distance.

In addition, it calculates the driving command of the traveling vehicle 11 based on a difference between the current position of the stacker crane 9 and the position of the second shelf in the first direction.

Furthermore, it calculates the driving commands of the first hoisting motor 17a and the second hoisting motor 19a, based on the positions of the first shelf and the second shelf in the height direction and the current positions of the first hoist carriage 17 and the second hoist carriage 19 in the height direction.

By the driving command of the traveling vehicle 11, the driving command of the lateral movement motor 251, and the driving command of the hoist carriage described above, the command to make the first transfer device 21 directly face the first shelf with the lateral movement is able to be calculated, and the second transfer device 23 is able to be controlled to directly face the second shelf.

In Step S73, the driving command to allow the traveling vehicle 11 to travel after the lateral movement of the first transfer device 21 is able to be calculated, or the driving command to laterally move the first transfer device 21 after the traveling vehicle 11 travels is able to be calculated, or the driving commands to simultaneously perform the lateral movement of the first transfer device 21 and the travel of the traveling vehicle 11 is able to be calculated.

Furthermore, in Step S74, after the lateral movement of the first transfer device 21 and the travel of the stacker crane 9, the transfer controller 41 calculates the driving commands to simultaneously drive the front hooks 21a of the first transfer device 21 and the front hooks 23a of the second transfer device 23.

As described above, if the first transfer device 21 can move laterally, the storage of the material A to the first shelf by the first transfer device 21 and the retrieval of the material A from the second shelf by the second transfer device 23 can be performed simultaneously.

It should be noted that, when the first transfer device 21 can directly face the first shelf while the second transfer device 23 can directly face the second shelf without the lateral movement, the simultaneous transfer can be performed without the lateral movement.

On the other hand, when the inter-shelf distance is not within the laterally movable range ("No" in Step S72), i.e., when the inter-shelf distance is larger than the maximum value of the inter-transfer-device distance or when the inter-shelf distance is smaller than the minimum value of the inter-transfer-device distance, the transfer controller 41 determines to disable the lateral movement of the first transfer device 21.

Accordingly, the transfer controller 41 calculates the driving commands to independently perform the storage of the material A to the first shelf by the first transfer device 21 and the retrieval of the material A from the second shelf by the second transfer device 23.

In other words, it calculates the driving commands of the traveling vehicle 11 to move the first transfer device 21 to a position corresponding to the position of the first shelf in the first direction, and to move the second transfer device 23 to a position corresponding to the position of the second shelf in the first direction, only by the travel of the stacker crane 9.

In addition, it calculates the driving command of the first hoist carriage 17 to move the first transfer device 21 to a height position corresponding to the height position of the first shelf by moving up and down the first hoist carriage 17. Furthermore, it calculates the driving command of the second hoist carriage 19 to move the second transfer device 23 to a height position corresponding to the height position of the second shelf by moving up and down the second hoist carriage 19.

Specifically, in Step S75, it calculates the driving command of the traveling vehicle 11 to move the first transfer device 21 to a position corresponding to the position of the first shelf in the first direction, and to move the second transfer device 23 to a position corresponding to the position of the second shelf in the first direction, only by the travel of the stacker crane 9.

In addition, it calculates the driving commands of the first hoisting motor 17a and the second hoisting motor 19a, based the positions of the first shelf and the second shelf in the height direction, and the current positions of the first hoist carriage 17 and the second hoist carriage 19 in the height direction.

By the above-mentioned driving command of the traveling vehicle 11 and the driving command of the hoist carriage, the commands to make the first transfer device 21 directly face the first shelf are able to be calculated, and the second transfer device 23 is able to be controlled to directly face the second shelf, without applying the lateral movement.

After that, in Step S76, it calculates the driving commands to drive the front hooks 21a when the first transfer device 21 directly faces the first shelf, and to drive the front hooks 23a when the second transfer device 23 directly faces the second shelf, i.e., the driving commands to independently drive the front hooks 21a of the first transfer device 21 and the front hooks 23a of the second transfer device.

It should be noted that, in the above description, the driving commands are able to be calculated to first move the stacker crane 9, and/or to move the first hoist carriage 17 up and down, and the first transfer device 21 directly faces the first shelf, to store the material A to the first shelf by the first transfer device 21, and after that to move the stacker crane 9 from the position, and/or to move the second hoist carriage 19 up and down, and the second transfer device 23 directly faces the second shelf, and to retrieve the material A from the second shelf by the second transfer device 23.

Alternatively, on the contrary, the driving commands are able to be calculated to first move the stacker crane 9, and/or to move the second hoist carriage 19 up and down, and the second transfer device 23 directly faces the second shelf, to retrieve the material A from the second shelf by the second transfer device 23, and after that to move the stacker crane 9 from the position, and/or to move the first hoist carriage 17 up and down, and the first transfer device 21 directly faces the first shelf, and to store the material A to the first shelf by the first transfer device 21.

By performing Steps S75 to S76 as described above, when the distance between the first shelf as a storing destination of the material A and the second shelf as a retrieving source of the material A is not within the laterally movable range, and it is determined to disable the lateral movement of the first transfer device 21, the driving command is able to be calculated to perform the storage or the retrieval of the material A by one of the first transfer device 21 and the second transfer device 23, and then to allow the traveling vehicle 11 (stacker crane 9) to travel in the first direction, and to perform the storage or retrieval of the material A by the other transfer device.

After performing Steps S71 to S76 as described above, the transfer controller 41 outputs the driving commands calculated in Step S77 to the corresponding individual portions of the stacker crane 9.

When the driving commands are output to the corresponding individual portions of the stacker crane 9, the individual portions of the stacker crane 9 operate in accordance with the input actuation commands in Step S8 (FIG. 6), and the storage of the material A by the first transfer device 21 and the retrieval of the material A by the second transfer device 23 are performed.

Hereinafter, with reference to some operation examples, it is described how the storage and retrieval (transfer) of the material A are performed in the automated warehouse 1 according to the first preferred embodiment, by executing the above-mentioned Steps S1 to S8 and Steps S71 to S77.

In the following description, when the first state is selected by the switch 60, the transfer operations in the following cases are described: (I) the case where the inter-transfer-device distance between the first transfer device 21 and the second transfer device 23 is able to be made equal or substantially equal to the inter-shelf distance between the first shelf and the second shelf by the lateral movement (referred to as Operation Example 1); and (II) the case where the inter-transfer-device distance is not able to be made equal to the inter-shelf distance by the lateral movement (referred to as Operation Example 2).

In addition, in each operation example, the transfer operations in the following cases are described: (i) the case where the first state is selected by the switch 60 (the state where the lateral movement of the first transfer device 21 is enabled); and (ii) the case where the second state is selected by the switch 60 (the state where the lateral movement of the first transfer device 21 is disabled).

Furthermore, the transfer operation in the following case is also described: the case where the storage of the material A and the retrieval of the material A can be performed simultaneously without the lateral movement in spite that one of the states is selected by the switch 60 (referred to as Operation Example 3).

In the following description, as illustrated in FIGS. 8A and 8B, the origin O on the first hoist carriage 17 is at the back end of the first hoist carriage 17 in the first direction. In addition, the position of the back end of the first transfer device 21 in the first direction is a reference position of the first transfer device 21. In other words, it is defined that the first transfer device 21 is at the origin O when the back end of the first transfer device 21 in the first direction is at the origin O.

In addition, as illustrated in FIGS. 8A and 8B, the minimum value of the inter-transfer-device distance is defined as a distance between the front hooks 21a of the first transfer device 21 on the front side in the first direction at the origin O on the first hoist carriage 17, and the front hooks 23a on the front side in the first direction of the second transfer device 23, and is denoted by $D_o$. In addition, the lateral movement range information I2, i.e. a maximum value of a laterally movable distance of the first transfer device 21 is denoted by $\Delta$. Therefore, the maximum value of the inter-transfer-device distance when the lateral movement is enabled can be denoted by $D_o+\Delta$.

FIGS. 8A and 8B are diagrams schematically illustrating definitions of the minimum value of the inter-transfer-device distance and the lateral movement range. FIG. 8A is a top view of the first hoist carriage 17 and the second hoist carriage 19, and FIG. 8B is a side view of the first hoist carriage 17 and the second hoist carriage 19.

Hereinafter, the transfer operation of the material A in the case where the inter-transfer-device distance is able to be made equal or substantially equal to the inter-shelf distance by the lateral movement (Operation Example 1) is described.

Figure 9A:
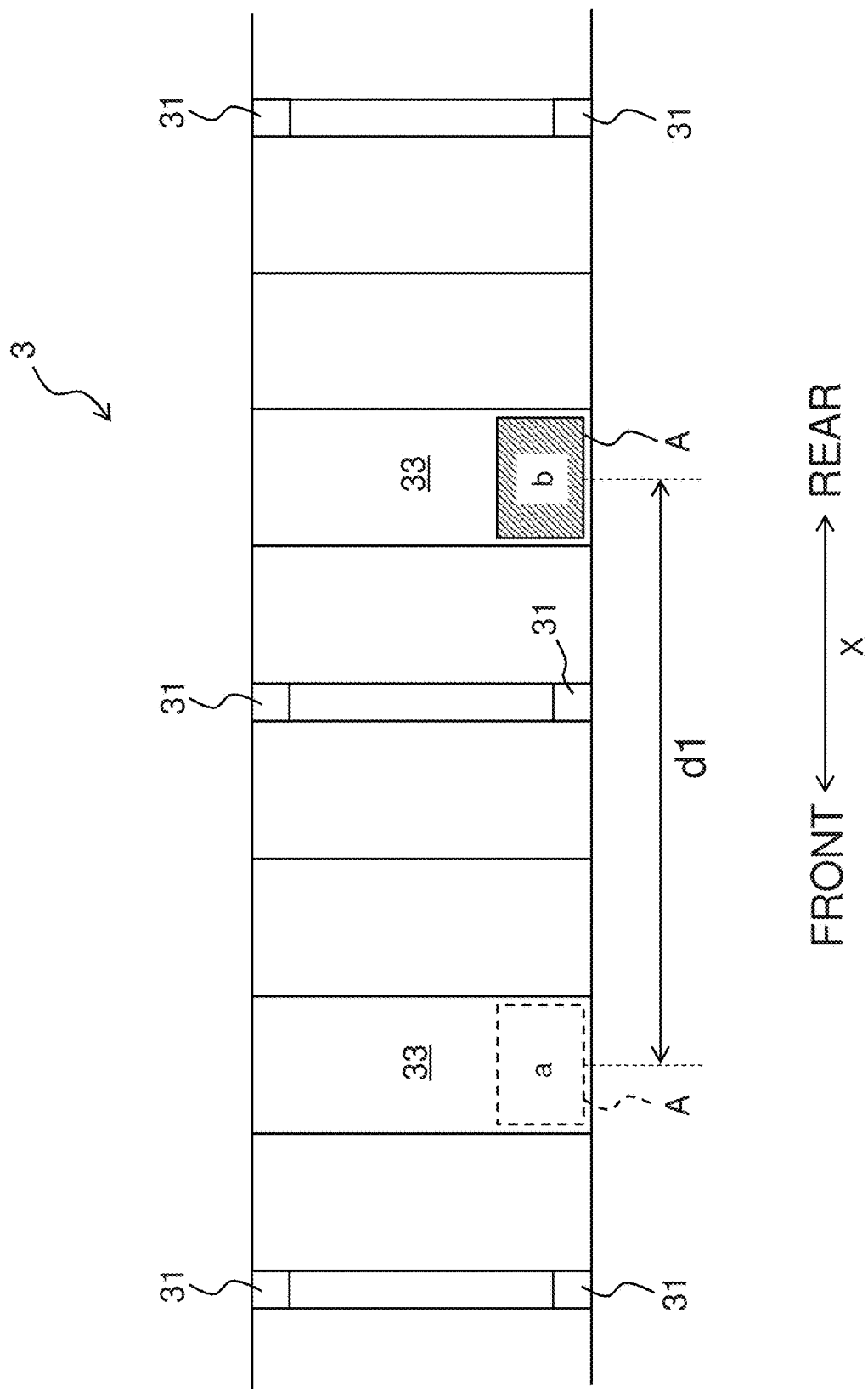
FIG. 9A is a diagram illustrating one example of a material placement state in Operation Example 1.

In Operation Example 1, as illustrated in FIG. 9A, the material A denoted by "a" is stored to the shelf 33 (the first shelf) on the front side in the first direction by the first transfer device 21, and the material A (denoted by "b") is retrieved from the shelf 33 (the second shelf) on the rear side in the first direction spaced apart therefrom by a distance d1 with one column 31 therebetween, by the second transfer device 23.

FIG. 9A is a diagram illustrating one example of a material placement state in Operation Example 1.

Figure 9B:
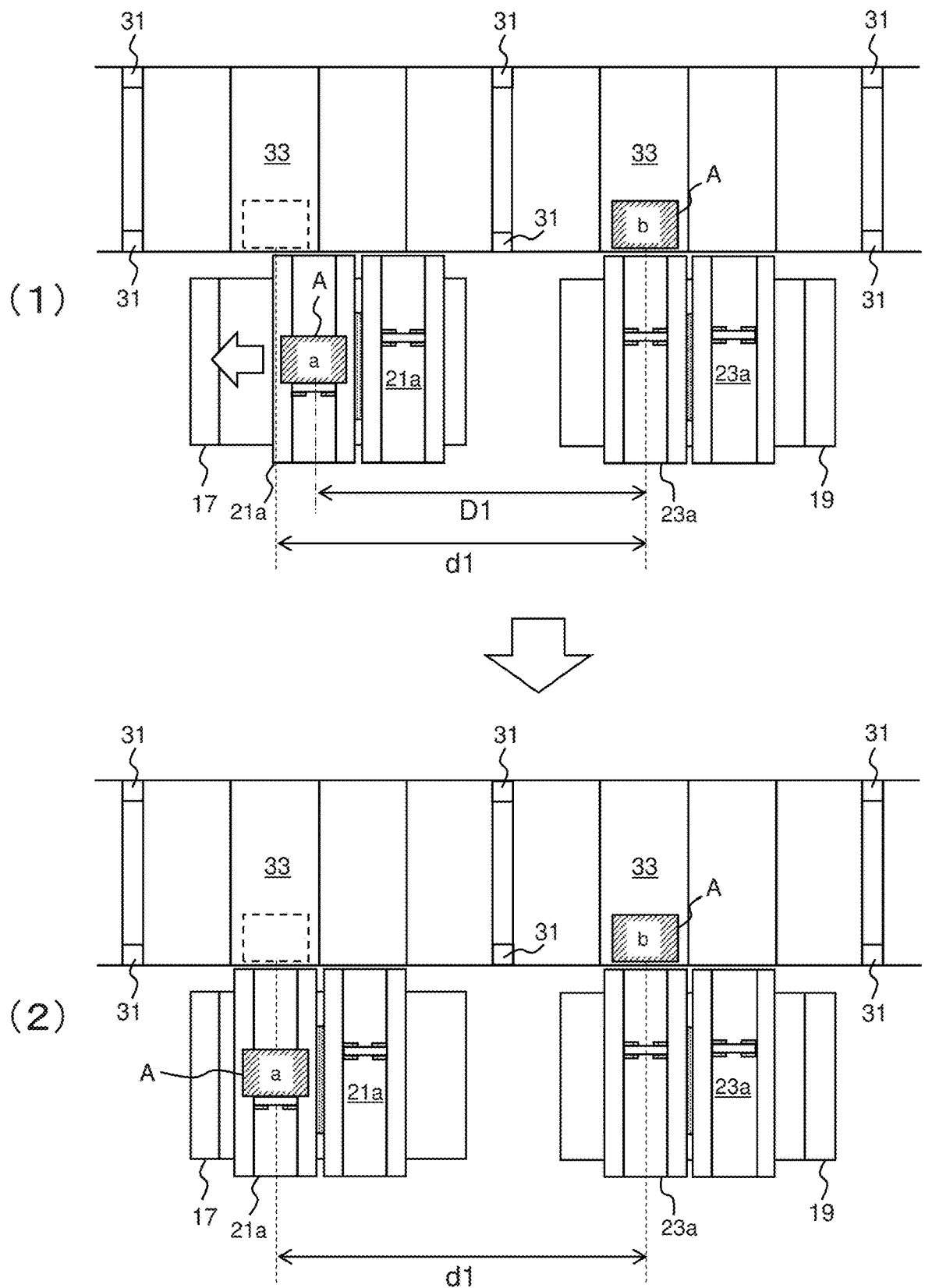
FIG. 9B is a diagram schematically illustrating a transfer operation of a material when the lateral movement is enabled in Operation Example 1 (Case 1).

In addition, as illustrated in FIG. 9B referred to later, before starting the transfer of the material A, the material A to be stored to the first shelf are supported by the front hooks 21a of the first transfer device 21 on the front side in the first direction.

Figure 9C:
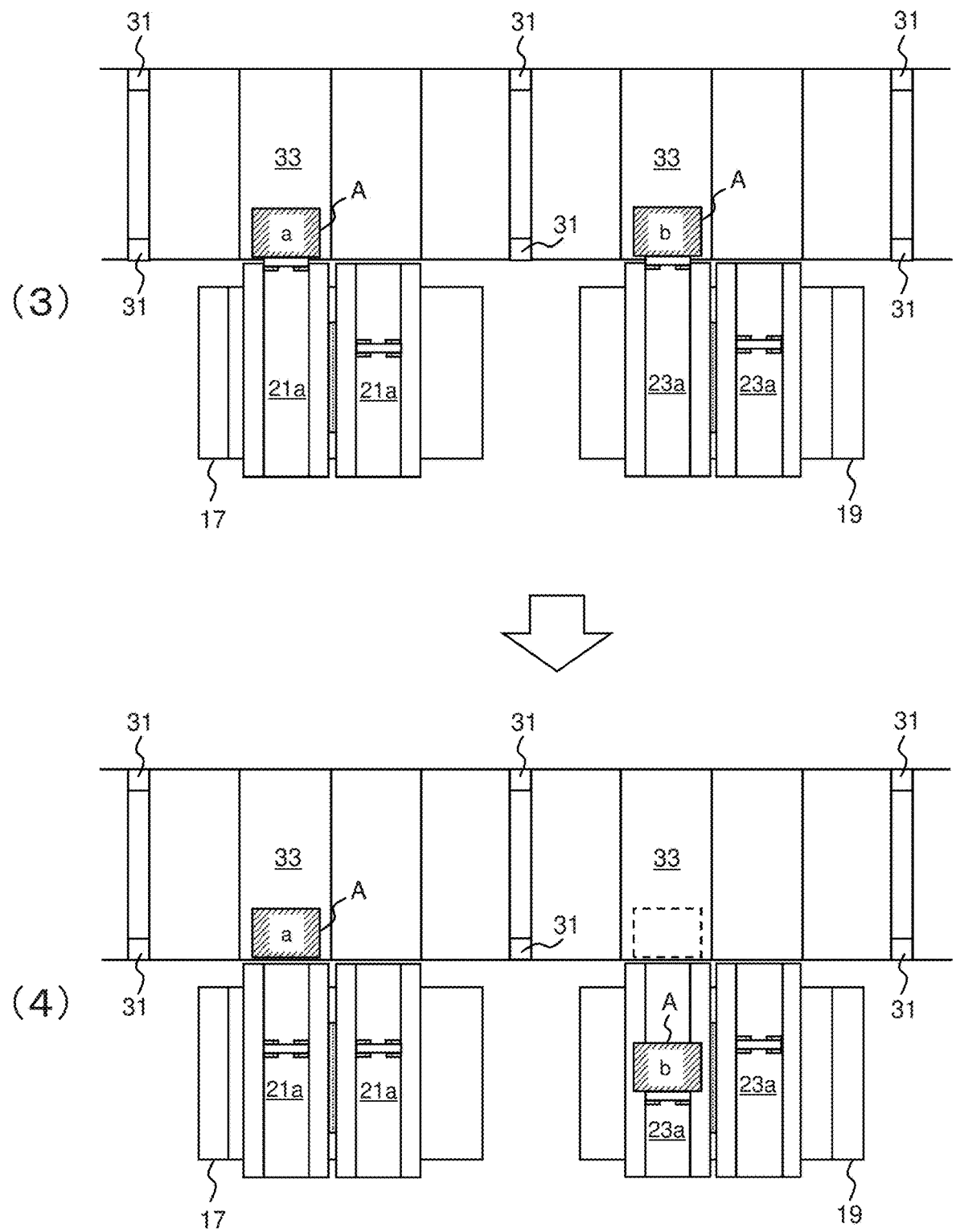
FIG. 9C is a diagram schematically illustrating a transfer operation of a material when the lateral movement is enabled in Operation Example 1 (Case 2).

Hereinafter, with reference to FIGS. 9B and 9C, the transfer operation of the material A when the lateral movement is enabled in Operation Example 1 is described. FIGS. 9B and 9C are diagrams schematically illustrating the transfer operation of the material A when the lateral movement is enabled in Operation Example 1. It should be noted that in this operation example, the relationship $D_o \leq d1 \leq D_o+\Delta$ holds.

When the lateral movement is enabled, when receiving the transfer command from the host controller 50, the transfer controller 41 determines a measured value of the number of pulses output from the encoder 251b as the current lateral position information. In addition, the transfer controller 41 determines the lateral movement range information I2 ($=\Delta$) stored in the storage 43a as the current laterally movable range.

Accordingly, since the inter-shelf distance d1 is larger than or equal to the minimum value of the inter-transfer-device distance $D_o$ and smaller than or equal to the maximum value of the inter-transfer-device distance $D_o+\Delta$, it is determined that the inter-shelf distance d1 is within the currently determined laterally movable range in Step S72. As a result, the transfer controller 41 determines to move the first transfer device 21 laterally in Step S72.

After determining to move the first transfer device 21 laterally, the transfer controller 41 calculates, in addition to the driving commands of the traveling vehicle 11, the first hoisting motor 17a, and the second hoisting motor 19a, the driving command of the lateral movement motor 251 to move the front hooks 21a of the first transfer device 21 on the front side in the first direction to the position corresponding to the position of the first shelf in the first direction.

For instance, the transfer controller 41 calculates the driving command of the lateral movement motor 251 based on the difference (d1−D1) between the current inter-transfer-device distance (the distance D1 in FIG. 9B) and the distance d1.

After the driving commands are calculated and output to the individual portions, the transfer operation of the material A starts.

Here, in the transfer operation of the material A described above, the driving of the traveling vehicle 11, the first hoisting motor 17a, and the second hoisting motor 17b (the travel by the stacker crane 9/the moving up and down of the hoist carriage) is executed first, the front hooks 23a of the second transfer device 23 on the front side in the first direction then directly face the second shelf.

Accordingly, as illustrated in (1) of FIG. 9B, when the inter-shelf distance (=d1) is not equal to the current inter-transfer-device distance (=D1), the lateral movement motor 251 is driven by the driving command calculated based on the difference (d1−D1) between the two distances, and the first transfer device 21 moves laterally.

After that, as illustrated in (2) of FIG. 9B, when the front hooks 21a of the first transfer device 21 on the front side in the first direction directly face the first shelf, the lateral movement of the first transfer device 21 is finished, and the inter-shelf distance and the inter-transfer-device distance are equal or substantially equal to d1. As a result, the front hooks 23a of the second transfer device 23 on the front side in the first direction directly face the second shelf, and the front hooks 21a of the first transfer device 21 on the front side in the first direction directly face the first shelf.

After that, as illustrated in (3) of FIG. 9C, the front hooks 21a of the first transfer device 21 on the front side in the first direction move to the first shelf side while supporting the material A, and then release the support of the material A on the first shelf. Accordingly, as illustrated in (4) of FIG. 9C, the material A is stored to the first shelf. After that, the front hooks 21a move to the first transfer device 21 side.

At the same or substantially the same time, the front hooks 23a of the second transfer device 23 on the front side in the first direction move to the second shelf side and support the material A placed on the second shelf. The front hooks 23a move to the second transfer device 23 side while supporting the material A. Accordingly, as illustrated in (4) of FIG. 9C, the material A is retrieved from the second shelf. As described above, when the lateral movement of the first transfer device 21 is enabled, the storage of the material A by the first transfer device 21 and the retrieval of the material A by the second transfer device 23 can be performed simultaneously.

It should be noted that, in the transfer operation of the material A described above, traveling of the stacker crane 9 and moving up and down of the hoist carriage may be performed at the same or substantially the same time as the lateral movement of the first transfer device 21. Alternatively, traveling of the stacker crane 9 and moving up and down of the hoist carriage may be performed after the lateral movement of the first transfer device 21.

Figure 9D:
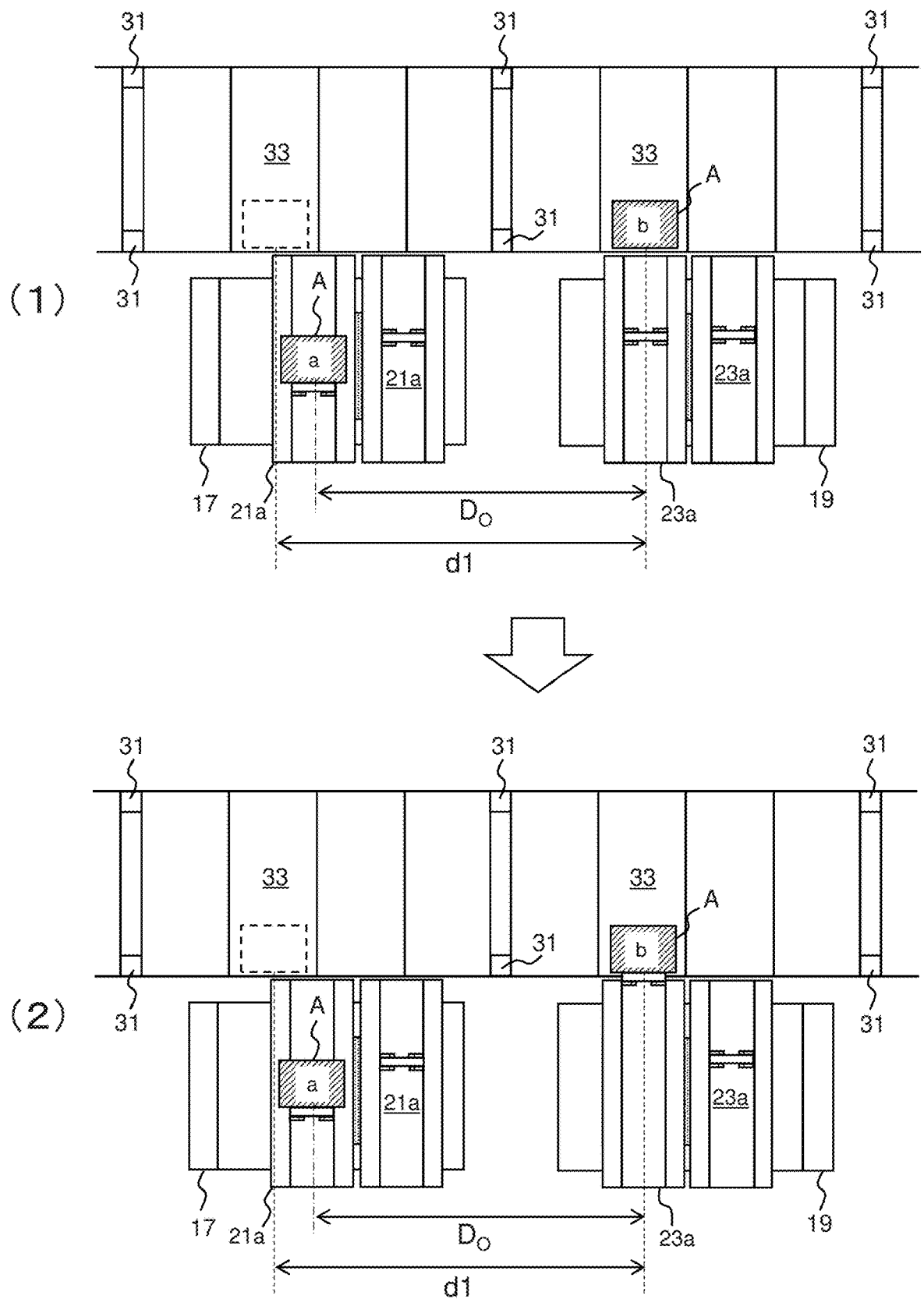
FIG. 9D is a diagram schematically illustrating a transfer operation of a material when the lateral movement is disabled in Operation Example 1 (Case 1).
Figure 9E:
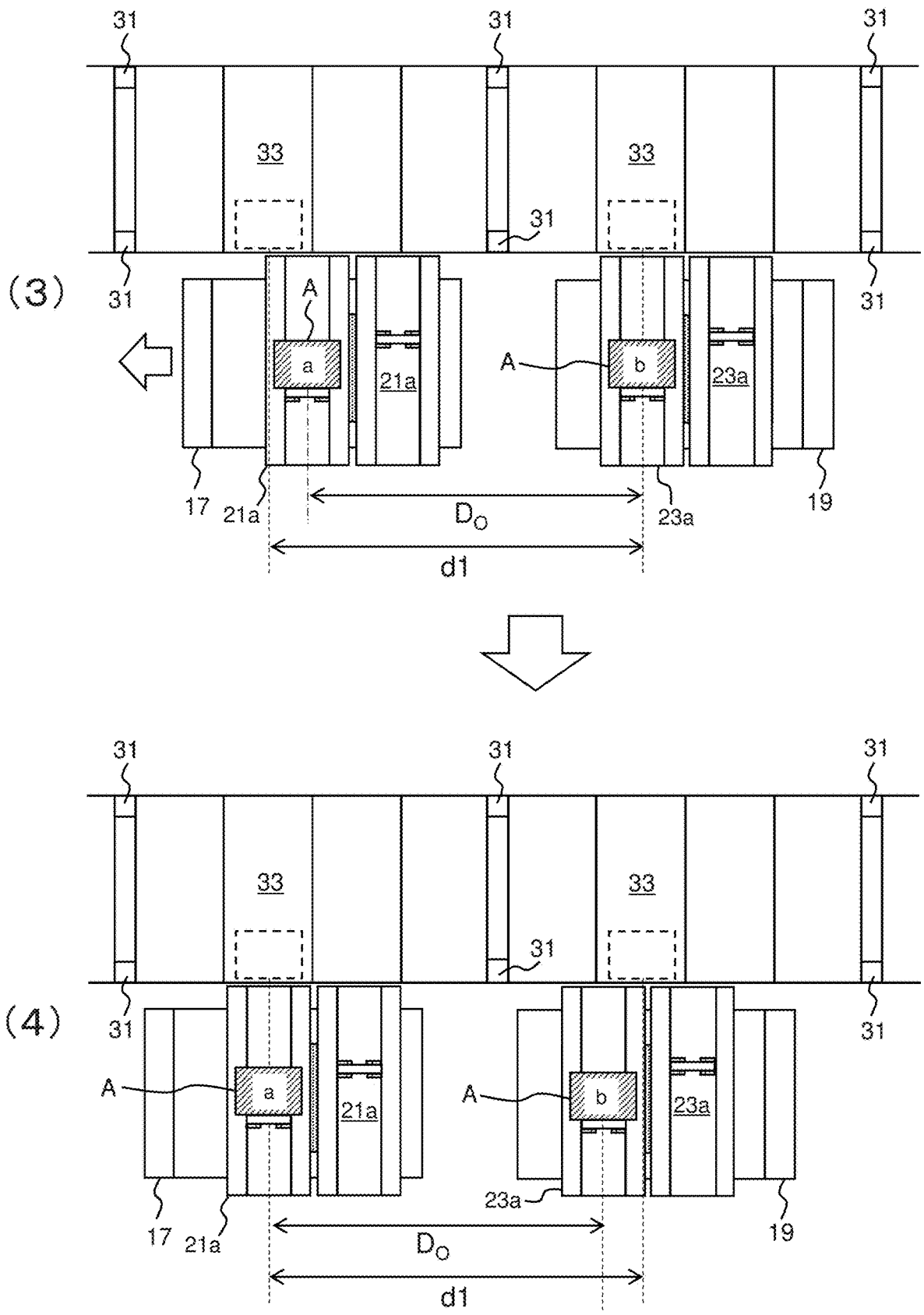
FIG. 9E is a diagram schematically illustrating a transfer operation of a material when the lateral movement is disabled in Operation Example 1 (Case 2).
Figure 9F:
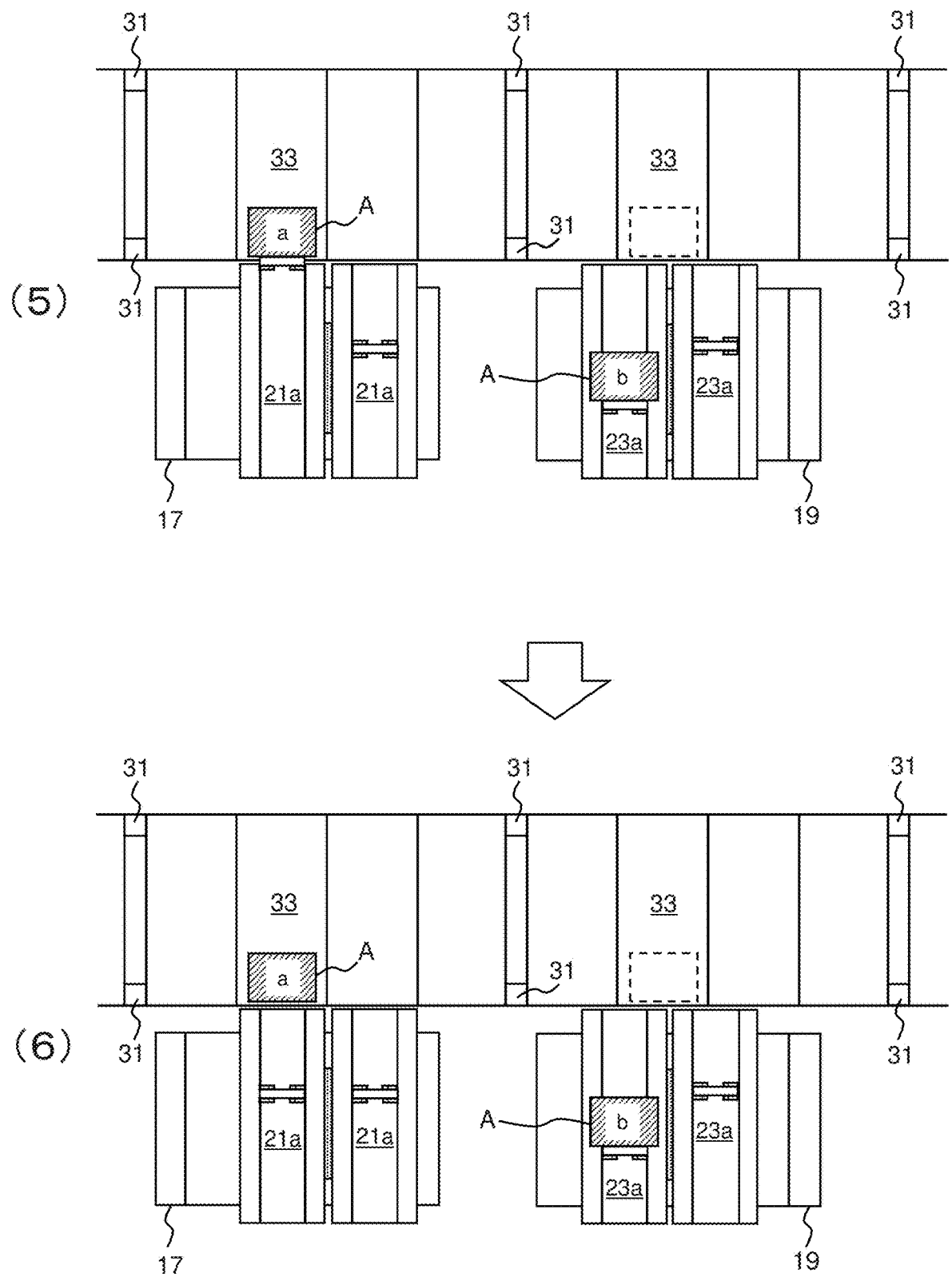
FIG. 9F is a diagram schematically illustrating a transfer operation of a material when the lateral movement is disabled in Operation Example 1 (Case 3).

Hereinafter, with reference to FIGS. 9D to 9F, the transfer operation of the material A when the lateral movement is disabled in Operation Example 1 is described. FIGS. 9D to 9F are diagrams schematically illustrating the transfer operation of the material A when the lateral movement is disabled in Operation Example 1. In this example, the inter-shelf distance d1 is larger (d1>$D_o$) than the maximum value of the inter-transfer-device distance (=$D_o$). In addition, when the lateral movement is disabled, the first transfer device 21 is at the origin O on the first hoist carriage 17.

When the lateral movement is disabled, when receiving the transfer command from the host controller 50, the transfer controller 41 determines the origin position information I1 stored in the storage 43a as the current lateral position information. In addition, the transfer controller 41 determines the pseudo lateral movement range information I3 (zero value) stored in the storage 43a as the current laterally movable range.

Therefore, when the lateral movement is disabled, the minimum value of the inter-transfer-device distance and the maximum value of the inter-transfer-device distance are both $D_o$.

Accordingly, since the inter-shelf distance d1 is larger than the maximum value of the inter-transfer-device distance (=$D_o$), it is determined that the inter-shelf distance d1 is not within the currently determined laterally movable range in Step S72. As a result, the transfer controller 41 determines not to move the first transfer device 21 laterally in Step S72.

When determining not to move the first transfer device 21 laterally, the transfer controller 41 calculates only the driving commands of the traveling vehicle 11, the first hoisting motor 17a, and the second hoisting motor 19a. Specifically, it calculates the driving commands to allow the front hooks 21a of the first transfer device 21 to directly face the first shelf by the traveling of the stacker crane 9 and the moving up and down of the first hoist carriage 17, and the driving commands to allow the front hooks 23a of the second transfer device 23 to directly face the second shelf by the traveling of the stacker crane 9 and the moving up and down of the second hoist carriage 19.

After the driving commands are calculated and output to the individual portions, the transfer operation of the material A starts.

Here, in the transfer operation of the material A described above, the driving commands to allow the front hooks 23a to directly face the second shelf is executed first, then the front hooks 23a of the second transfer device 23 on the front side in the first direction directly face the second shelf.

Accordingly, as illustrated in (1) of FIG. 9D, when the inter-shelf distance (=d1) is not equal to the current inter-transfer-device distance (=$D_o$), the front hooks 23a are first moved to the second shelf side in the current position as illustrated in (2) of FIG. 9D, and then the material A placed on the second shelf is supported by the front hooks 23a. The material A is retrieved from the second shelf by the second transfer device 23 by further moving the front hooks 23a supporting the material A to the second transfer device 23 side. As a result, as illustrated in (3) of FIG. 9E, the front hooks 21a of the first transfer device 21 support the material A, and at the same or substantially the same time, the front hooks 23a of the second transfer device support the material A.

After that, as illustrated in (4) of FIG. 9E, the front hooks 21a of the first transfer device 21 on the front side in the first direction directly face the first shelf by the traveling of the stacker crane 9 and the moving up and down of the first hoist carriage 17.

After the front hooks 21a directly faces the first shelf, as illustrated in (5) of FIG. 9F, the front hooks 21a supporting the material A are moved to the first shelf side, and then supporting of the material A is released on the first shelf. Accordingly, as illustrated in (6) of FIG. 9F, the material A is stored to the first shelf. After that, the front hooks 21a move to the first transfer device 21 side.

As described above, the storage and retrieval of the material A without the lateral movement, in which, for example, the retrieval of the material A is performed by the second transfer device 23, the first transfer device 21 faces the first shelf by the traveling of the stacker crane 9 to perform the storage of the material A by the first transfer device 21, can be performed, by selecting the second state by the switch 60 when the lateral movement mechanism 25 malfunctions. As a result, although conveyance performance is lowered compared with the case where the lateral movement mechanism 25 is enabled, the stopping of the transfer due to the malfunctions of the lateral movement mechanism 25, which is conventionally occurred, is able to be prevented.

It should be noted that, in the transfer operation of the material A described above, the front hooks 21a of the first transfer device 21 is able to first directly face the first shelf to perform the storage of the material A by the first transfer device 21, the front hooks 23a of the second transfer device 23 then directly face the second shelf to perform the retrieval of the material A by the second transfer device 23.

Hereinafter, transfer of the material A in a case where the inter-transfer-device distance is not able to be made equal to the inter-shelf distance even by the lateral movement (Operation Example 2) is described.

Figure 10A:
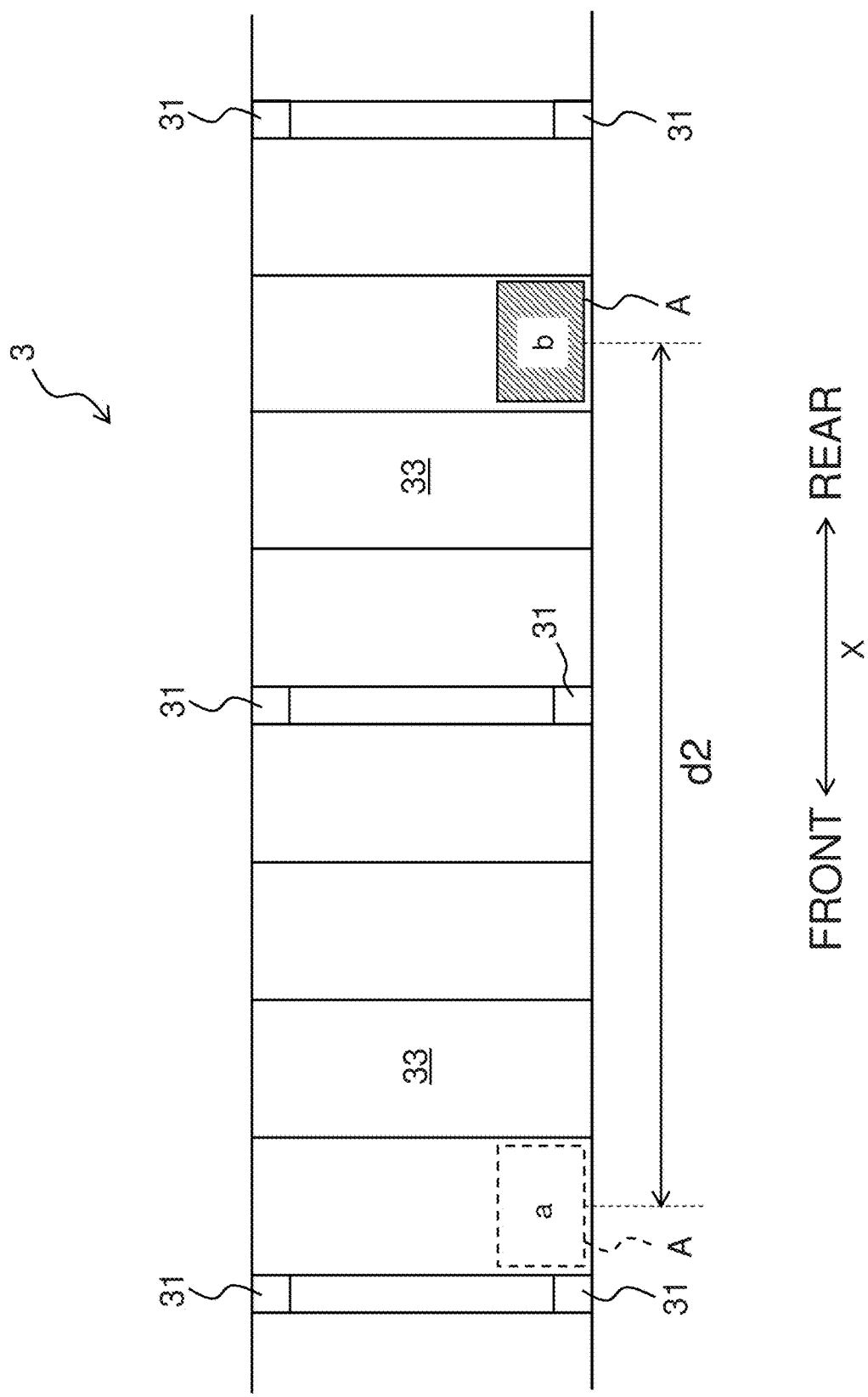
FIG. 10A is a diagram illustrating one example of a material placement state in Operation Example 2.

In Operation Example 2, as illustrated in FIG. 10A, the material A denoted by "a" is stored to the shelf 33 (the first shelf) on the front side in the first direction by the first transfer device 21, and the material A (denoted by "b") placed on the shelf 33 (the second shelf) on the rear side in the first direction spaced apart therefrom by a distance d2, with one column 31 therebetween, is retrieved by the second transfer device 23. In this Operation Example 2, the relationship $d2 > D_o + \Delta$ holds.

FIG. 10A is a diagram illustrating one example of the material placement state in Operation Example 2.

Figure 10B:
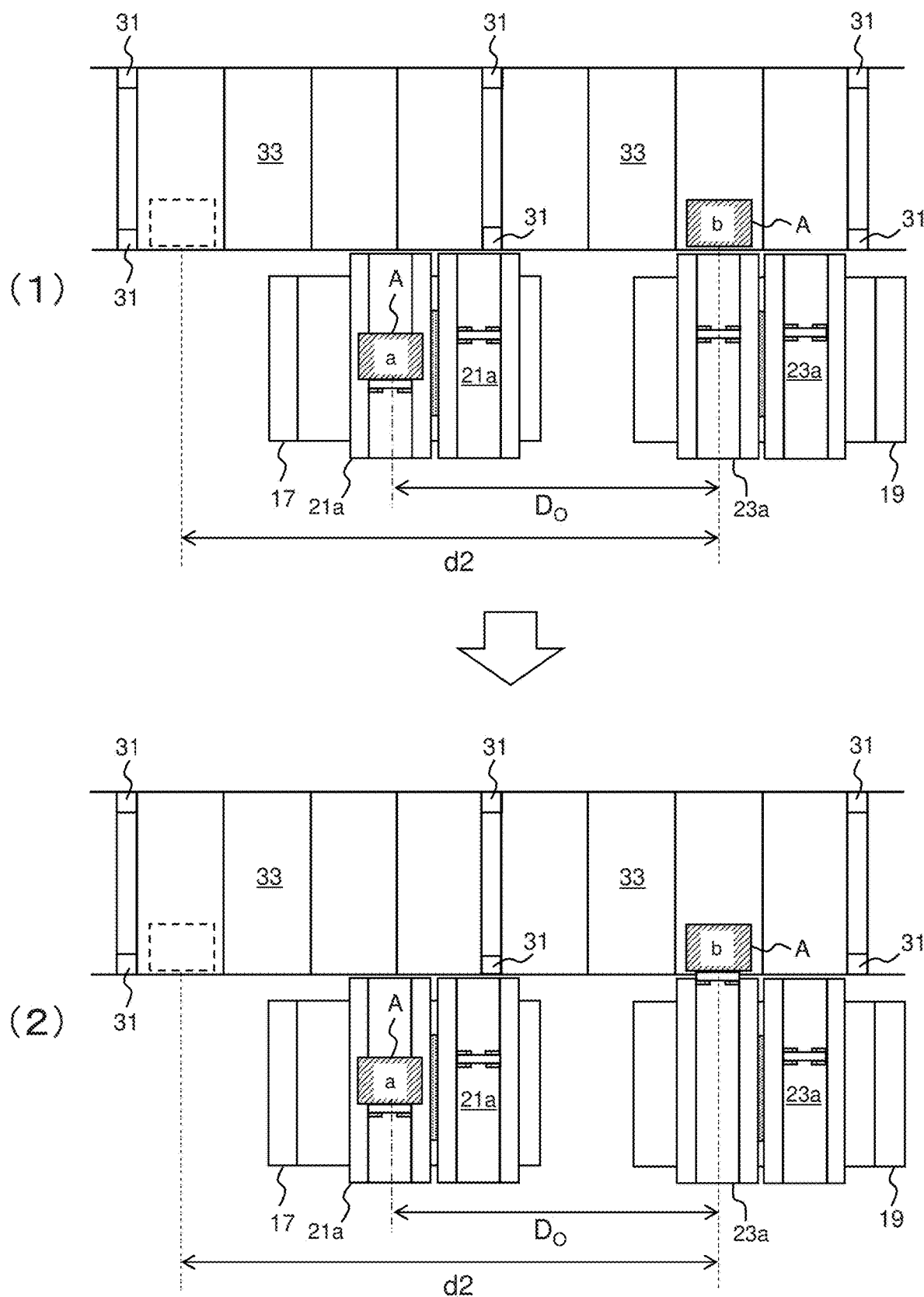
FIG. 10B is a diagram schematically illustrating a transfer operation of a material when the lateral movement is enabled in Operation Example 2 (Case 1).

In addition, as illustrated in FIG. 10B referred to later, before starting the transfer of the material A, the material A to be stored to the first shelf is supported by the front hooks 21a of the first transfer device 21 on the front side in the first direction.

Hereinafter, with reference to FIGS. 10B to 10D, the transfer operation of the material A when the lateral movement is enabled in Operation Example 2 is described. FIGS. 10B to 10D are diagrams schematically illustrating the transfer operation of the material A when the lateral movement is enabled in Operation Example 2.

When the lateral movement is enabled, when receiving the transfer command from the host controller 50, the transfer controller 41 determines a measured value of the number of pulses output from the encoder 251b as the current lateral position information. In addition, the transfer controller 41 determines the lateral movement range information I2 ($=\Delta$) stored in the storage 43a as the current laterally movable range.

Accordingly, since the inter-shelf distance d2 is larger than the maximum value of the inter-transfer-device distance $D_o + \Delta$, it is determined that the inter-shelf distance d2 is not within the currently determined laterally movable range in Step S72. As a result, the transfer controller 41 determines not to move the first transfer device 21 laterally in Step S72.

When determining not to move the first transfer device 21 laterally, the transfer controller 41 calculates only the driving commands of the traveling vehicle 11, the first hoisting motor 17a, and the second hoisting motor 19a. Specifically, it calculates the driving commands to allow the front hooks 21a of the first transfer device 21 to directly face the first shelf by the traveling of the stacker crane 9 and the moving up and down of the first hoist carriage 17, and the driving commands to allow the front hooks 23a of the second transfer device 23 to directly face the second shelf by the traveling of the stacker crane 9 and the moving up and down of the second hoist carriage 19.

After the driving commands are calculated and output to the individual portions, the transfer operation of the material A starts.

Here, in the transfer operation of the material A described above, the driving commands to allow the front hooks 23a to directly face the second shelf is executed first, then the front hooks 23a of the second transfer device 23 on the front side in the first direction directly face the second shelf.

Accordingly, as illustrated in (1) of FIG. 10B, since the inter-shelf distance (=d2) is not equal to the current inter-transfer-device distance (=D2), as illustrated in (2) of FIG. 10B, the front hooks 23a are first moved to the second shelf side in the current position. Then, the material A placed on the second shelf is supported by the front hooks 23a. The material A is retrieved from the second shelf by the second transfer device 23 by further moving the front hooks 23a supporting the material A to the second transfer device 23 side. As a result, as illustrated in (3) of FIG. 10C, the front hooks 21a of the first transfer device 21 support the material A, and the front hooks 23a of the second transfer device support the material A.

After that, as illustrated in (4) of FIG. 10C, the front hooks 21a of the first transfer device 21 on the front side in the first direction directly face the first shelf by the traveling of the stacker crane 9 the moving up and down of the first hoist carriage 17. After the front hooks 21a directly face the first shelf, as illustrated in (5) of FIG. 10D, the front hooks 21a supporting the material A move to the first shelf side, and then supporting of the material A is released on the first shelf. Accordingly, as illustrated in (6) of FIG. 10D, the material A is stored to the first shelf. After that, the front hooks 21a move to the first transfer device 21 side.

By the transfer operation described above, even if the inter-shelf distance is beyond the laterally movable range, the storage and retrieval of the material A, in which, for example, the second transfer device 23 retrieves the material A, and then the first transfer device 21 directly faces the first shelf by the traveling of the stacker crane 9 to store the material A, can be performed.

The transfer operation of the material A when the lateral movement is disabled in Operation Example 2 is the same or substantially the same as the transfer operation when the lateral movement is enabled as described above. Therefore, the description is omitted here.

Figure 11A:
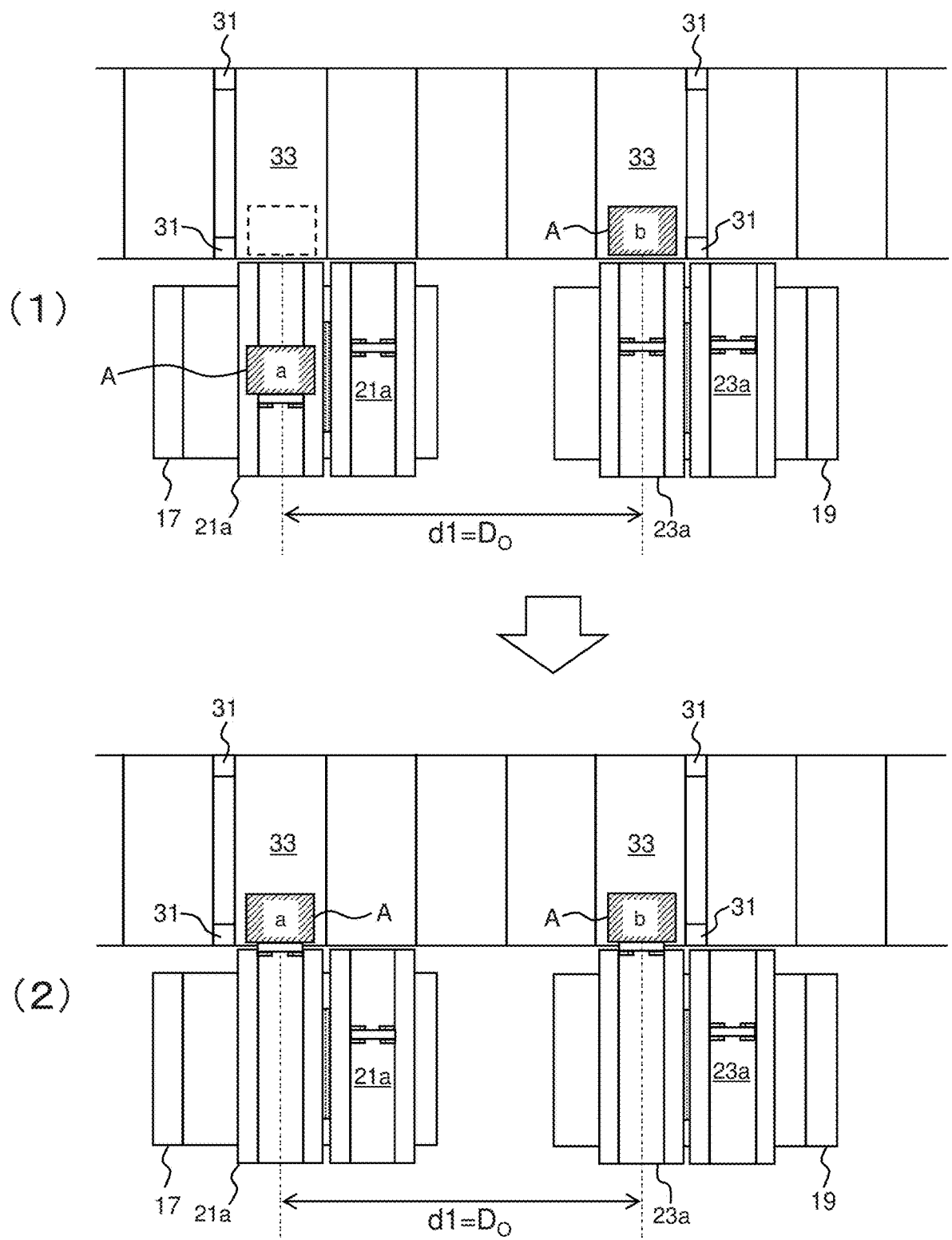
FIG. 11A is a diagram schematically illustrating a transfer operation of a material in Operation Example 3 (Case 1).
Figure 11B:
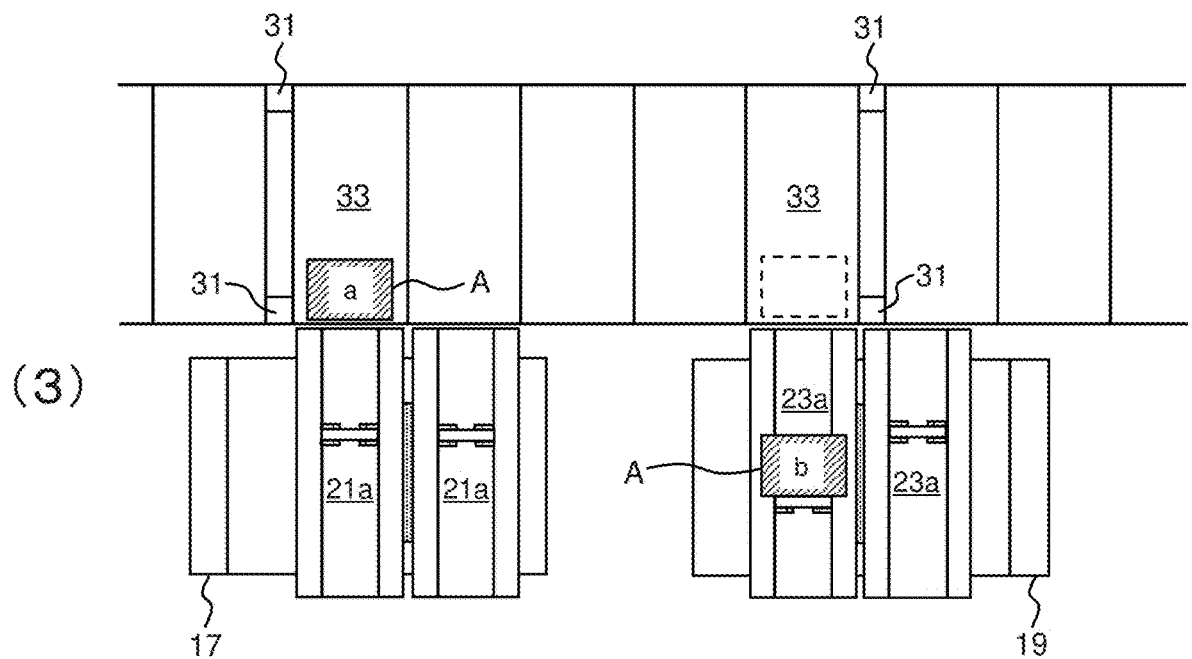
FIG. 11B is a diagram schematically illustrating a transfer operation of a material in Operation Example 3 (Case 2).

Hereinafter, with reference to FIGS. 11A and 11B, the transfer operation in a case where the storage and retrieval of the material A can be simultaneously performed without the lateral movement of the first transfer device 21 in spite that either of the first state or the second state is selected by the switch 60 (referred to as Operation Example 3) is described. FIGS. 11A and 11B are diagrams schematically illustrating the transfer operation of the material A in Operation Example 3.

In Operation Example 3, as illustrated in FIG. 11A, the material A denoted by "a" is stored to the shelf 33 (the first shelf) on the front side in the first direction by the first transfer device 21, and the material A (denoted by "b") placed on the shelf 33 (the second shelf) on the rear side in the first direction spaced apart therefrom by a distance d1 is retrieved by the second transfer device 23. In this Operation Example 3, there is no column 31 between the two shelves 33 on which the materials A are placed, and that the relationship $d1 = D_o$ holds. It should be noted that the following operation can be performed also in the case where there is the column 31 between the two shelves 33 on which the material A are placed, and the relationship d1=$D_o$ holds.

In addition, as illustrated in FIG. 11A, before starting the transfer of the material A, the material A to be stored to the first shelf is supported by the front hooks 21a of the first transfer device 21 on the front side in the first direction.

Therefore, in Operation Example 3, after the front hooks 23a of the second transfer device 23 on the front side in the first direction directly face the second shelf, the front hooks 21a supporting the material A are moved to the first shelf side as illustrated in (2) of FIG. 11A, and then supporting of the material A is released on the first shelf. Accordingly, as illustrated in (3) of FIG. 11B, the material A is stored to the first shelf. After that, the front hooks 21a move to the first transfer device 21 side.

At the same or substantially the same time, the front hooks 23a of the second transfer device 23 on the front side in the first direction move to the second shelf side and support the material A placed on the second shelf. The front hooks 23a supporting the material A move to the second transfer device 23 side. Accordingly, as illustrated in (3) of FIG. 11B, the material A is retrieved from the second shelf.

Accordingly, for example, as illustrated in FIG. 11A, after the front hooks 23a of the second transfer device 23 on the front side in the first direction directly face the second shelf, when the inter-shelf distance d1 is equal or substantially equal to the minimum value of the inter-transfer-device distance $D_o$, i.e. when the relationship d1=$D_o$ holds, the storage of the material A by the first transfer device 21 and the retrieval of the material A by the second transfer device 23 can be performed simultaneously.

The automated warehouse 1 according to the first preferred embodiment is able to provide the following advantageous effects.

When the switch 60 selects the second state in which the lateral movement of the first transfer device 21 is disabled, the transfer controller 41 calculates and outputs the commands to move the first transfer device 21 to the first shelf, and to move the second transfer device 23 to the second shelf, without the lateral movement of the first transfer device 21.

Accordingly, even if the lateral movement mechanism 25 malfunctions and the first transfer device 21 cannot be moved laterally, by selecting the second state with the switch 60, the first transfer device 21 and the second transfer device 23 can be moved to the positions of the target shelves by the movement of the stacker crane 9. For example, even if the lateral movement mechanism 25 malfunctions, as the switch 60 disables the lateral movement of the first transfer device 21 (the second state), conveyance of the material A can be continued by the movement of the stacker crane 9 until an operator resolves the malfunction of the lateral movement mechanism 25.

Accordingly, in the automated warehouse 1, even if the lateral movement mechanism 25 malfunctions, conveyance of material A can be continued without applying the lateral movement mechanism 25. As a result, reduction in conveyance performance when the lateral movement mechanism 25 malfunctions is able to be reduced or prevented.

The storage station 5 and the retrieval station 7 are spaced apart from each other by a distance, which enables simultaneous transfer of the material A by the first transfer device 21 located at the origin O on the first hoist carriage 17 and the second transfer device 23.

Accordingly, transfer of the material A to and from the storage station 5 and the retrieval station 7 can be performed by the first transfer device 21 and the second transfer device 23, even if the first transfer device 21 cannot move laterally.

Accordingly, even if the first transfer device 21 cannot move laterally, transfer of the material to and from the storage station 5 and the retrieval station 7 can be performed with the first transfer device 21 and the second transfer device 23.

In addition, the above-mentioned stations are used more frequently than the shelves 33.

On the other hand, the distance between the two shelves 33 differs according to positions of the selected shelves 33. Therefore, even if the distance between the first transfer device 21 and the second transfer device 23 is set to a distance between two specific shelves 33, if two shelves 33 other than the two specific shelves 33 are selected, there may be a case where simultaneous transfer of the material A cannot be performed by the first transfer device 21 and the second transfer device 23, depending on the positions of the two selected shelves 33.

Therefore, by matching the distance between the storage station 5 and the retrieval station 7, which are used more frequently than the shelves 33, with the distance between the first transfer device 21 at the origin O on the first hoist carriage 17 and the second transfer device 23, even if the lateral movement mechanism 25 malfunctions, transfer of the material A between the storage station 5 and the first transfer device 21, and transfer of the material A between the retrieval station 7 and the second transfer device 23, which are used more frequently, can be performed simultaneously. As a result, reduction in conveyance performance of the material A is able to be decreased or prevented.

The transfer controller 41 determines a position of the first transfer device 21 on the first hoist carriage 17 based on the lateral position information output from the lateral movement controller 43.

When it is determined in Step S2 that the first state is selected by the switch 60, the lateral movement controller 43 outputs the position detected by the encoder 251b as the lateral position information in Step S3.

In contrast, when it is determined in Step S2 that the second state is selected by the switch 60, the lateral movement controller 43 outputs the origin position information I1 (the origin O) stored in the storage 43a as the lateral position information in Step S5.

Accordingly, when the first state is selected by the switch 60, i.e. when the lateral movement mechanism 25 is working normally, a measured value of the position detected by the encoder 251b is able to be provided as the position of the first transfer device 21 on the first hoist carriage 17.

On the other hand, when the second state is selected by the switch 60, i.e. when the lateral movement mechanism 25 malfunctions, it is regarded that the first transfer device 21 is at the origin O, the malfunction of the lateral movement mechanism 25 is ignored, and conveyance of the material A can be continued.

The transfer controller 41 determines a controlled variable of the lateral movement mechanism 25 (lateral movement motor 251) based on the laterally movable range output from the lateral movement controller 43.

When it is determined in Step S2 that the first state is selected by the switch 60, the lateral movement controller 43 outputs the lateral movement range information I2 (=Δ) defining a range that the first transfer device 21 can move laterally from the origin O on the first hoist carriage 17 as the laterally movable range in Step S4.

On the other hand, when it is determined in Step S2 that the second state is selected by the switch 60, the lateral movement controller 43 outputs the pseudo lateral movement range information I3 (zero value) indicating that the first transfer device 21 does not move laterally from the origin O as the laterally movable range in Step S6.

Accordingly, when the first state is selected by the switch 60, the lateral movement mechanism 25 can move the first transfer device 21 laterally, and conveyance of the material A can be continued.

On the other hand, when the second state is selected by the switch 60, the first transfer device 21 is not moved laterally from the origin O, and conveyance of the material A can be continued.

In addition, only by switching the output value of the laterally movable range when the switch 60 switches between the first state and the second state, activation/deactivation of the lateral movement can be switched. As a result, control regarding the lateral movement can be shared by the portions (the transfer controller 41 and the actual controller 43b) other than the switching of activation/deactivation by switching of the laterally movable range.

For instance, the lateral movement controller 43 may be defined by the actual controller 43b that controls the lateral movement mechanism 25, the pseudo controller 43c that performs the pseudo control regarding the lateral movement, and the control switch 43d that determines whether to connect the transfer controller 41 with the actual controller 43b or to connect the transfer controller 41 with the pseudo controller 43c, based on the state set by the switch 60.

Accordingly, without changing the existing control portion regarding the lateral movement (the actual controller 43b and the transfer controller 41), by adding a new function (by adding the pseudo controller 43c and the control switch 43d), the control regarding the lateral movement described above can be realized. It is because there is no necessity to add the process when the lateral movement mechanism 25 or the like malfunctions to the existing actual controller 43b and transfer controller 41.

As a result, a load on operators is able to be reduced when incorporating the above-mentioned function regarding the lateral movement into the existing controller. This is because the following reason.

In general, when the existing control portion is changed to implement a new function, other existing control portions are also affected by the change, and therefore the other control portions need to be changed. When changes are added to many of the existing control portions, it causes a large load on operators.

On the other hand, when the new function is implemented by adding a new control portion, the existing control portions are hardly affected by the addition, and little change is required to the existing control parts. As little change is required to the existing control parts, load on operators can be reduced.

The transfer controller 41 determines not to move the first transfer device 21 laterally when determining that the inter-shelf distance (the distance between the first shelf and the second shelf) is not within the laterally movable range in Step S72.

Accordingly, the transfer controller 41 calculates the commands in Steps S75 and S76 to transfer the material A by one of the first transfer device 21 and the second transfer device 23, and then to allow the traveling vehicle 11 (stacker crane 9) to travel to transfer the material A by the other transfer device.

Accordingly, even if the first transfer device 21 cannot be moved laterally (e.g. when the lateral movement is disabled in Operation Example 1 described above), or even if it is not sufficient to only move the first transfer device 21 laterally by the lateral movement mechanism 25 (e.g. in Operation Example 2 described above), conveyance of the material A can be continued.

Although the preferred embodiments of the present invention are described above, the present invention is not limited to the preferred embodiments described above, but can be variously modified within the scope of the invention without deviating from the spirit thereof. In particular, the plurality of preferred embodiments and variations described in this specification are able to be arbitrarily combined.

As to the processes described above with reference to the flowcharts illustrated in FIGS. 6 and 7, orders and contents of the processes can be modified within the scope of the present invention without deviating from the spirit thereof.

The stacker crane 9 may be provided with one hoist carriage, and a plurality of transfer devices may be mounted on the one hoist carriage. Accordingly, a portion of the plurality of transfer devices may be laterally movable.

The process described above can also be applied to this structure of the hoist carriage and the transfer devices.

In Operation Example 2 described above (in the case where the inter-transfer-device distance is not able to be made equal to the inter-shelf distance by the lateral movement), when the inter-shelf distance is larger than the maximum value of the inter-transfer-device distance, the first transfer device 21 is able to be moved laterally to set the inter-transfer-device distance to the maximum value, and then to move the first transfer device 21 and the second transfer device 23 to positions corresponding respectively to the positions of the first shelf and the second shelf in the first direction by the travel of the stacker crane 9.

On the other hand, when the inter-shelf distance is smaller than the minimum value of the inter-transfer-device distance, the first transfer device 21 is able to be moved laterally to set the inter-transfer-device distance to the minimum value, and then to move the first transfer device 21 and the second transfer device 23 to positions corresponding respectively to the positions of the first shelf and the second shelf in the first direction by the travel of the stacker crane 9.

Accordingly, the travel distance of the stacker crane 9 to convey the material A can be shortened.

For example, when transferring the material A between the shelves 33 with a short distance (e.g. between neighboring shelves 33) by applying the first transfer device 21, the material A is able to be conveyed only by the lateral movement of the first transfer device 21.

The process described above can be applied not only to the stacker crane 9 but also to other conveyance device including the hoist carriage and the transfer device that can move laterally.

Not only the first transfer device 21 that can move laterally on the first hoist carriage 17, but also the second transfer device 23 may be laterally movable on the second hoist carriage 19. Accordingly, when the lateral movement of at least one of the first transfer device 21 and the second transfer device 23 is disabled, the operation of conveying the material A described above in the first preferred embodiment can be performed.

The position of the first transfer device 21 on the first hoist carriage 17 can be measured by a sensor other than the encoder 251b of the first preferred embodiment that can measure a position and/or a distance of an object. A distance sensor, a barcode reader, or the like is able to be implemented as the sensor, for example.

The structure of the lateral movement mechanism 25 is not limited to that described above mainly with reference to FIG. 4, but can be a mechanism having a structure that can move a transfer device, for example, a mechanism including an air cylinder, for example.

The storage station 5 and/or the retrieval station 7 may be able to simultaneously transfer the materials A by the front hooks 21a of the first transfer device 21 at the origin O and the front hooks 23a of the second transfer device 23, respectively.

In other words, the first transfer device 21 and the second transfer device 23 may be able to transfer at most four materials A simultaneously to and from the storage station 5 and/or the retrieval station 7.

The storage station 5 described above may be able to not only store the material A but also retrieve the material A, and the retrieval station 7 may be able to not only retrieve the material A but also store the material A. Accordingly, the two stations may be provided as stations for storage or may be provided as stations for retrieval.

Preferred embodiments of the present invention can be widely applied to automated warehouses in which a transfer device that transfers a material to and from a placement element can be moved in a traveling direction of the conveyance device.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An automated warehouse comprising:
a conveyance device including:
a traveling device to travel in a first direction;
a support carriage provided to the traveling device;
a first transfer device provided to the support carriage to transfer a material to and from a first placement element;
a second transfer device located next to the first transfer device in the first direction on the support carriage to transfer the material to and from a second placement element; and
a lateral conveyor to laterally move the first transfer device in the first direction on the support carriage;
a switch to switch between a first state enabling lateral movement of the first transfer device, and a second state disabling the lateral movement of the first transfer device; and
a transfer controller to control the traveling device and/or the lateral conveyor based on current positions of the first transfer device and the second transfer device, and positions of the first placement element and the second placement element; wherein
even when an inter-transfer-device distance between the first transfer device and the second transfer device is able to be made equal or substantially equal to an inter-shelf distance between the first placement element and the second placement element by the lateral conveyor, when the second state is selected by the switch, the transfer controller controls the traveling device to move the first transfer device and the second transfer device to positions corresponding to the first placement element and the second placement element without moving the first transfer device laterally.

2. The automated warehouse according to claim 1, further comprising:
a first station where storage or retrieval of the material is performed and the material is transferred between the first transfer device; and
a second station where storage or retrieval of the material is performed and the material is transferred between the second transfer device; wherein
the first station and the second station are spaced apart from each other by a distance enabling simultaneous transfer of the material to and from the first transfer device at an origin on the support carriage and the second transfer device.

3. The automated warehouse according to claim 2, further comprising:
a lateral position detector to detect a position of the first transfer device on the support carriage;
a storage to store an origin of the first transfer device on the support carriage; and
a lateral movement controller to, when the first state is selected by the switch, output the position detected by the lateral position detector as lateral position information about the position of the first transfer device on the support carriage, and, when the second state is selected by the switch, to output the origin of the first transfer device stored in the storage as the lateral position information; wherein
the transfer controller determines the position of the first transfer device based on the lateral position information.

4. The automated warehouse according to claim 3, further comprising:
a lateral movement controller to, when the first state is selected by the switch, output lateral movement range information as a laterally movable range in which the first transfer device is able to move laterally, the lateral movement range information defining a range in which the first transfer device is able to move laterally from an origin of the first transfer device on the support carriage, and to, when the second state is selected by the switch, output pseudo lateral movement range information as the laterally movable range, the pseudo lateral movement range information indicating that the first transfer device does not move laterally from the origin of the first transfer device; wherein
the transfer controller determines a controlled variable of the lateral conveyor based on the laterally movable range output from the lateral movement controller.

5. The automated warehouse according to claim 4, wherein, when a distance between the first placement element to which a material is transferred and the second placement element is not within the laterally movable range, the transfer controller determines not to move the first transfer device laterally, controls one of the first transfer device and the second transfer device to transfer the material, and then controls the traveling device to travel to cause the another transfer device to transfer the material.

6. The automated warehouse according to claim 2, further comprising:
a lateral movement controller to, when the first state is selected by the switch, output lateral movement range information as a laterally movable range in which the first transfer device is able to move laterally, the lateral movement range information defining a range that the first transfer device is able to move laterally from an origin of the first transfer device on the support carriage, and to, when the second state is selected by the switch, output pseudo lateral movement range information as the laterally movable range, the pseudo lateral movement range information indicating that the first transfer device does not move laterally from the origin of the first transfer device; wherein the transfer controller determines a controlled variable of the lateral conveyor based on the laterally movable range output from the lateral movement controller.

7. The automated warehouse according to claim 6, wherein, when a distance between the first placement element to which the material is transferred and the second placement element is not within the laterally movable range, the transfer controller determines not to move the first transfer device laterally, controls one of the first transfer device and the second transfer device to transfer the material, and then controls the traveling device to travel to cause the another transfer device to transfer the material.

8. The automated warehouse according to claim 1, further comprising:
 a lateral position detector to detect a position of the first transfer device on the support carriage;
 a storage to store an origin of the first transfer device on the support carriage; and
 a lateral movement controller to, when the first state is selected by the switch, output the position detected by the lateral position detector as lateral position information about the position of the first transfer device on the support carriage, and, when the second state is selected by the switch, to output the origin of the first transfer device stored in the storage as the lateral position information; wherein
 the transfer controller determines the position of the first transfer device based on the lateral position information.

9. The automated warehouse according to claim 8, further comprising:
 a lateral movement controller to, when the first state is selected by the switch, output lateral movement range information as a laterally movable range in which the first transfer device is able to move laterally, the lateral movement range information defining a range in which the first transfer device is able to move laterally from an origin of the first transfer device on the support carriage, and to, when the second state is selected by the switch, output pseudo lateral movement range information as the laterally movable range, the pseudo lateral movement range information indicating that the first transfer device does not move laterally from the origin of the first transfer device; wherein
 the transfer controller determines a controlled variable of the lateral conveyor based on the laterally movable range output from the lateral movement controller.

10. The automated warehouse according to claim 9, wherein, when a distance between the first placement element to which a material is transferred and the second placement element is not within the laterally movable range, the transfer controller determines not to move the first transfer device laterally, controls one of the first transfer device and the second transfer device to transfer the material, and then controls the traveling device to travel to cause the another transfer device to transfer the material.

11. The automated warehouse according to claim 1, further comprising:
 a lateral movement controller to, when the first state is selected by the switch, output lateral movement range information as a laterally movable range in which the first transfer device is able to move laterally, the lateral movement range information defining a range in which the first transfer device is able to move laterally from an origin of the first transfer device on the support carriage, and to, when the second state is selected by the switch, output pseudo lateral movement range information as the laterally movable range, the pseudo lateral movement range information indicating that the first transfer device does not move laterally from the origin of the first transfer device; wherein
 the transfer controller determines a controlled variable of the lateral conveyor based on the laterally movable range output from the lateral movement controller.

12. The automated warehouse according to claim 11, wherein, when a distance between the first placement element to which the material is to be transferred and the second placement element is not within the laterally movable range, the transfer controller determines not to move the first transfer device laterally, controls one of the first transfer device and the second transfer device to transfer the material, and then controls the traveling device to travel to cause another transfer device to transfer the material.

13. A conveyance device to transfer material to and from a plurality of placement elements in an automated warehouse including a rack including the plurality of placement elements provided in a first direction, the conveyance device comprising:
 a traveling device to travel in the first direction;
 a support carriage provided to the traveling device;
 a first transfer device provided to the support carriage and to transfer the material to and from a first placement element of the rack;
 a second transfer device located next to the first transfer device in the first direction on the support carriage, and to transfer the material to and from a second placement element of the rack;
 a lateral conveyor to laterally move the first transfer device in the first direction on the support carriage; and
 a transfer controller to control the traveling device and/or the lateral conveyor based on current positions of the first transfer device and the second transfer device, and positions of the first placement element and the second placement element; wherein
 lateral movement of the first transfer device is enabled in a first state, and the lateral movement of the first transfer device is disabled in a second state; and
 even when an inter-transfer-device distance between the first transfer device and the second transfer device is able to be made equal or substantially equal to an inter-shelf distance between the first placement element and the second placement element by the lateral conveyor, when the second state is selected, the transfer controller controls the traveling device to move the first transfer device and the second transfer device to positions corresponding to the first placement element and the second placement element without moving the first transfer device laterally.

14. The conveyance device according to claim 13, further comprising:
 a lateral position detector to detect a position of the first transfer device on the support carriage;
 a storage to store an origin of the first transfer device on the support carriage; and
 a lateral movement controller to, when the first transfer device is in the first state, output the position detected by the lateral position detector as lateral position information about the position of the first transfer device on the support carriage, and to, when the first transfer device is in the second state, output the origin of the first transfer device stored in the storage as the lateral position information; wherein the transfer controller determines the position of the first transfer device based on the lateral position information.

15. The conveyance device according to claim 14, further comprising:

a lateral movement controller to, when the first transfer device is in the first state, output lateral movement range information as a laterally movable range in which the first transfer device is able to move laterally, the lateral movement range information defining a range that the first transfer device is able to move laterally from an origin of the first transfer device on the support carriage, and to, when the first transfer device is in the second state, output pseudo lateral movement range information as the laterally movable range, the pseudo lateral movement range information indicating that the first transfer device does not move laterally from the origin; wherein the transfer controller determines a controlled variable of the lateral conveyor based on the laterally movable range output from the lateral movement controller.

16. The conveyance device according to claim 15, wherein, when a distance between the first placement element to which a material is transferred and the second placement element is not within the laterally movable range, the transfer controller determines not to move the first transfer device laterally, controls one of the first transfer device and the second transfer device to transfer the material, and then controls the traveling device to travel to cause the another transfer device to transfer the material.

17. The conveyance device according to claim 13, further comprising:

a lateral movement controller to, when the first transfer device is in the first state, output lateral movement range information as a laterally movable range in which the first transfer device is able to move laterally, the lateral movement range information defining a range that the first transfer device is able to move laterally from an origin of the first transfer device on the support carriage, and to, when the first transfer device is in the second state, output pseudo lateral movement range information as the laterally movable range, the pseudo lateral movement range information indicating that the first transfer device does not move laterally from the origin; wherein the transfer controller determines a controlled variable of the lateral conveyor based on the laterally movable range output from the lateral movement controller.

18. The conveyance device according to claim 17, wherein, when a distance between the first placement element to which a material is transferred and the second placement element is not within the laterally movable range, the transfer controller determines not to move the first transfer device laterally, controls one of the first transfer device and the second transfer device to transfer the material, and then controls the traveling device to travel to cause the another transfer device to transfer the material.

\* \* \* \* \*